United States Patent
Okada

(10) Patent No.: US 6,876,126 B2
(45) Date of Patent: Apr. 5, 2005

(54) PIEZOELECTRIC ACTUATOR

(75) Inventor: Hiroyuki Okada, Izumi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/699,499

(22) Filed: Oct. 31, 2003

(65) Prior Publication Data
US 2004/0207290 A1 Oct. 21, 2004

Related U.S. Application Data

(62) Division of application No. 09/456,184, filed on Dec. 7, 1999, now Pat. No. 6,703,762.

(30) Foreign Application Priority Data

Dec. 17, 1998 (JP) .......................................... 10-359568

(51) Int. Cl.$^7$ ............................................. H01L 41/107
(52) U.S. Cl. ....................................................... 310/317
(58) Field of Search ................................. 310/311, 314, 310/316.01, 316.02, 317, 318, 320, 321, 359; 331/108 C, 158, 116 R

(56) References Cited

U.S. PATENT DOCUMENTS

| 4,613,782 A | * | 9/1986 | Mori et al. ............. 310/323.16 |
| 4,653,101 A | * | 3/1987 | Myers ........................ 381/64 |
| 4,997,177 A | | 3/1991 | Mori et al. .................. 271/267 |
| 5,101,178 A | * | 3/1992 | Komoda ..................... 331/158 |
| 5,210,454 A | * | 5/1993 | Naito ..................... 310/316.02 |
| 5,319,278 A | * | 6/1994 | Myohga et al. ........ 310/323.12 |
| 5,589,723 A | * | 12/1996 | Yoshida et al. ............. 310/328 |
| 5,646,469 A | * | 7/1997 | Tsukimoto et al. ..... 310/323.01 |
| 5,783,899 A | * | 7/1998 | Okazaki ..................... 310/317 |
| 5,912,525 A | * | 6/1999 | Kobayashi et al. .... 310/323.03 |
| 5,945,768 A | | 8/1999 | Treu, Jr. ................. 310/316.01 |
| 5,969,464 A | * | 10/1999 | Nakano et al. ............. 310/328 |
| 6,133,671 A | * | 10/2000 | Atsuta et al. .......... 310/316.01 |
| 6,140,750 A | | 10/2000 | Ueyama ..................... 310/369 |
| 6,177,753 B1 | | 1/2001 | Atsuta ................... 310/316.01 |
| 6,703,762 B1 | * | 3/2004 | Okada ........................ 310/317 |

FOREIGN PATENT DOCUMENTS

| EP | 0 347 846 A2 | 12/1989 |
| JP | 1-122375 A | 5/1989 |
| JP | 9-9650 A | 1/1991 |
| JP | 6-232469 A | 8/1994 |
| JP | 7-123744 A | 5/1995 |
| JP | 9-37572 A | 2/1997 |
| JP | 10-290588 A | 10/1998 |

* cited by examiner

Primary Examiner—Thomas M. Dougherty
(74) Attorney, Agent, or Firm—Sidley Austin Brown & Wood LLP

(57) ABSTRACT

In a piezoelectric actuator, a first driving signal amplified a predetermined sine wave is applied to a piezoelectric device in a direction parallel to a polarization direction thereof. A second driving signal having a negative phase with respect to the first driving signal which is amplified the sine wave is applied to the piezoelectric device in a direction opposite to the polarization direction. Thus, the piezoelectric device is driven by a driving signal amplified the first or second driving signal double. Voltages of the first and second driving signals are much smaller than a voltage of inversion of polarization of ceramic thin plates constituting the piezoelectric device.

5 Claims, 18 Drawing Sheets

FIG. 3
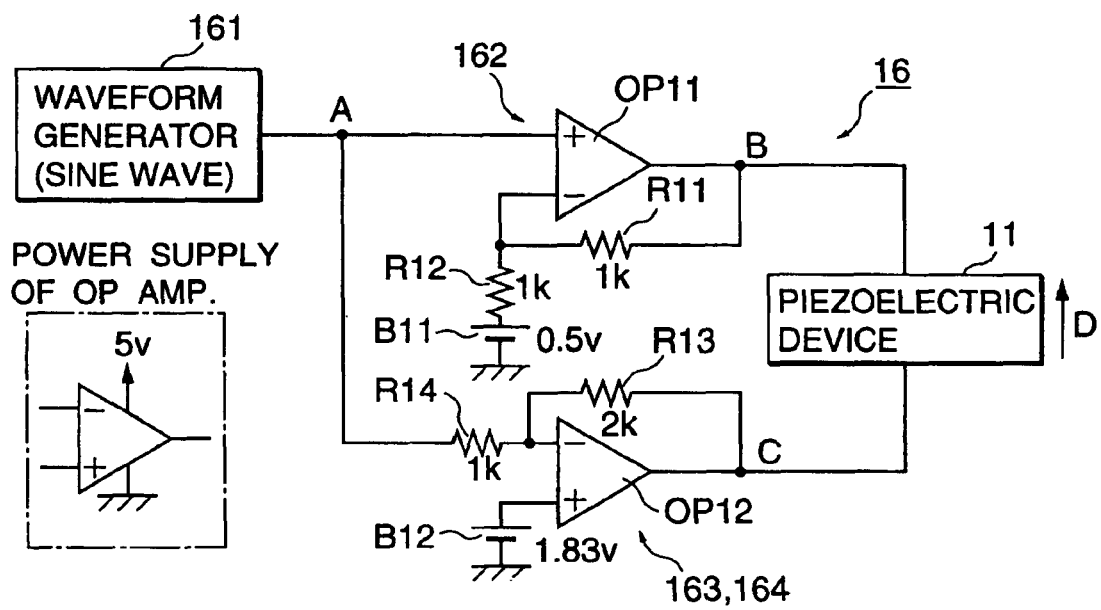
FIG. 4A  A
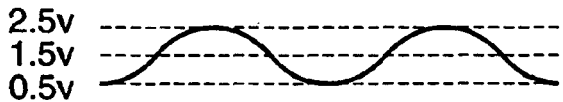
FIG. 4B  B
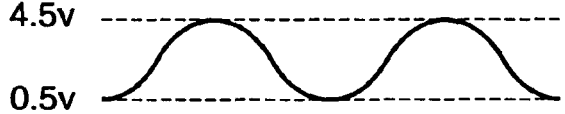
FIG. 4C  C
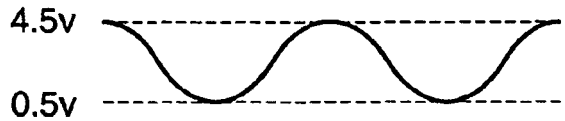
FIG. 4D  D
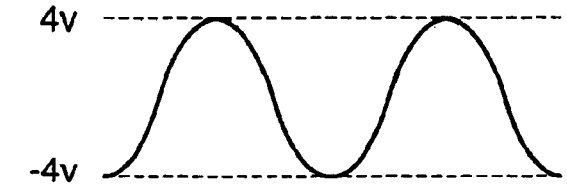

FIG. 5
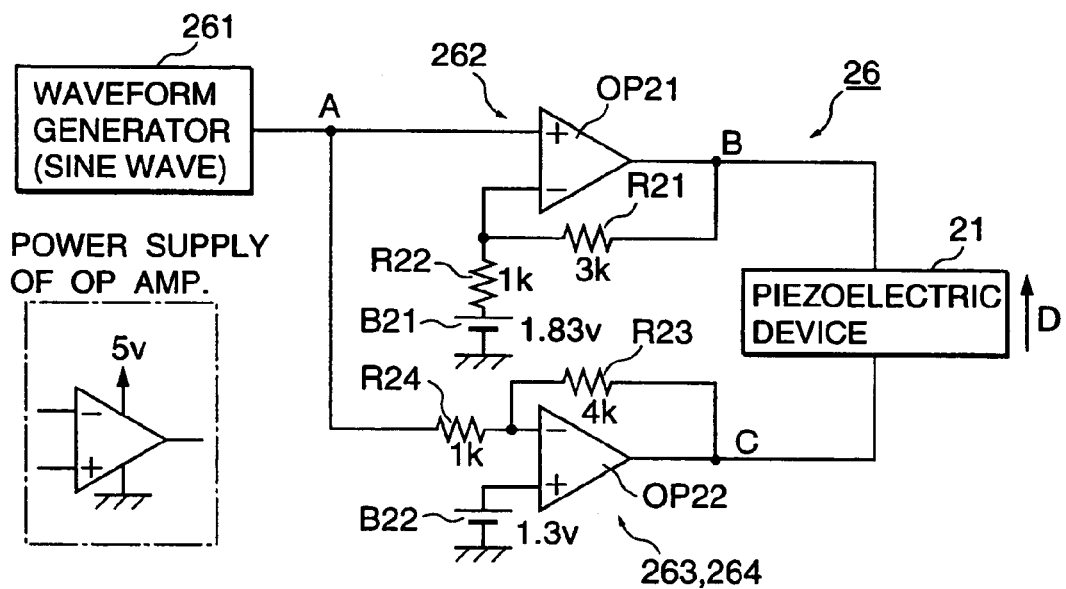
FIG. 6A  A  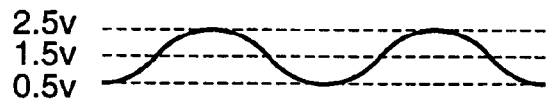
FIG. 6B  B  
FIG. 6C  C  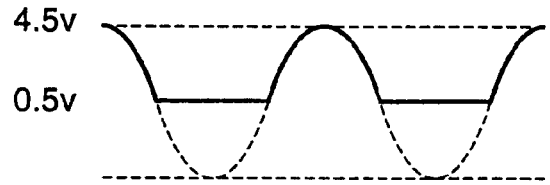
FIG. 6D  D  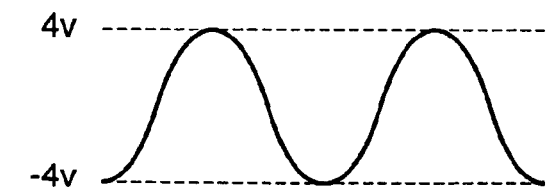

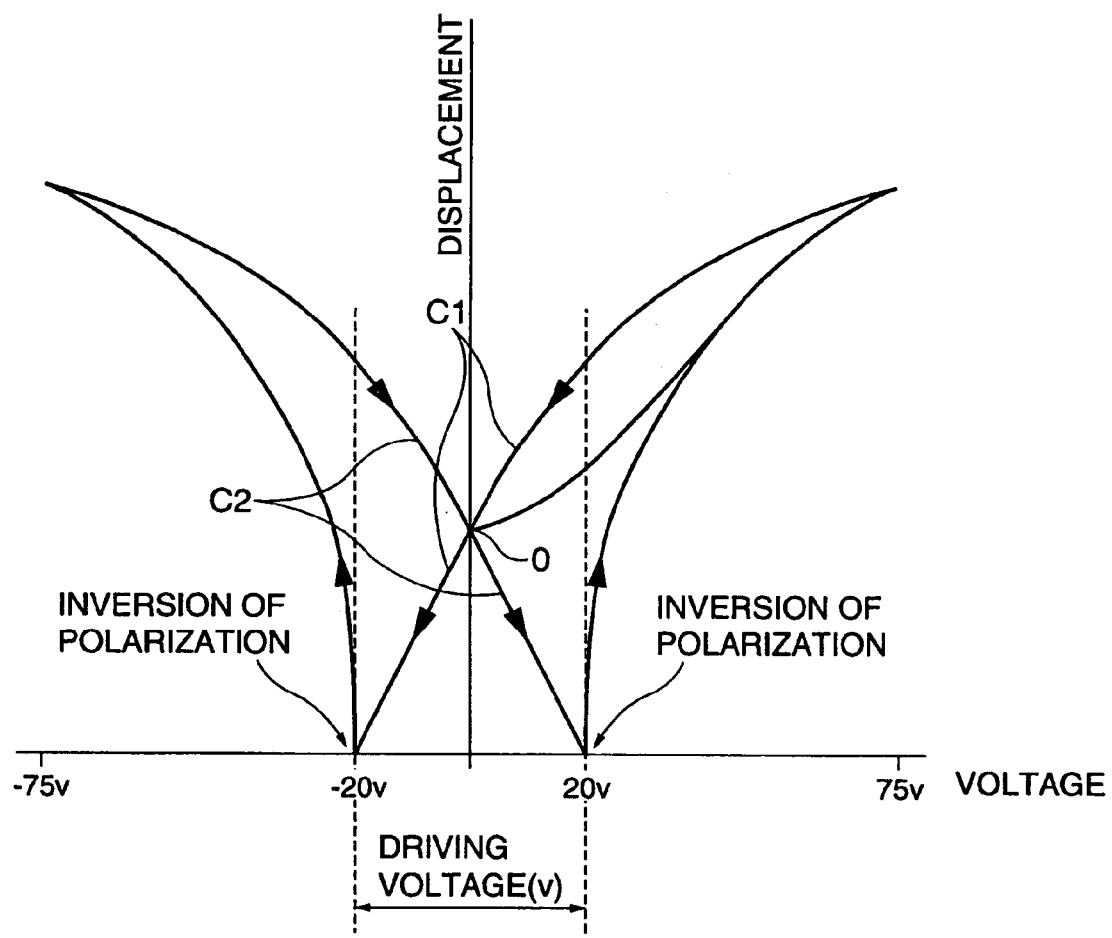

FIG. 14A  A
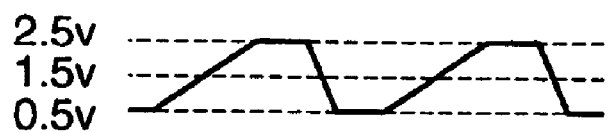
FIG. 14B  B
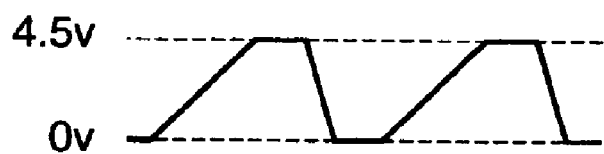
FIG. 14C  C
FIG. 14D  D
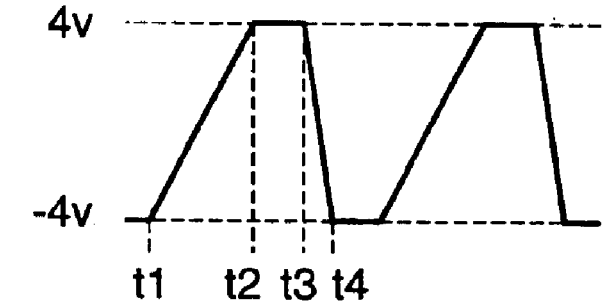

FIG. 15
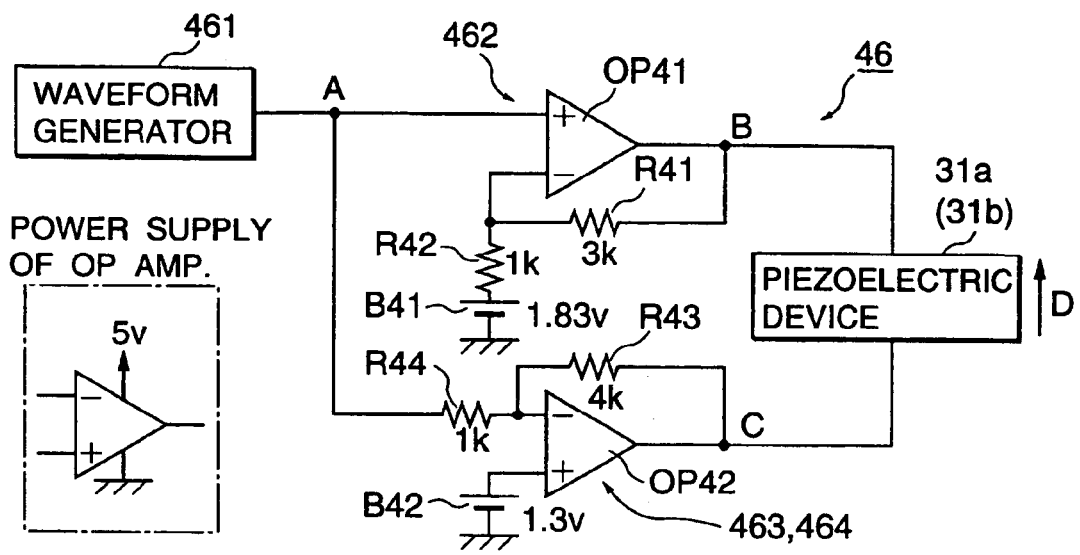
FIG. 16A  A
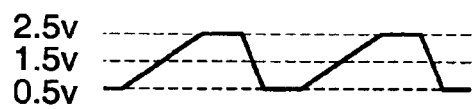
FIG. 16B  B
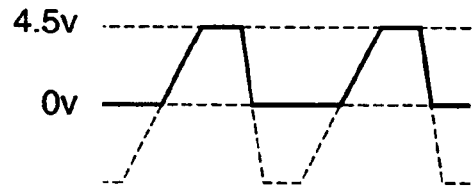
FIG. 16C  C
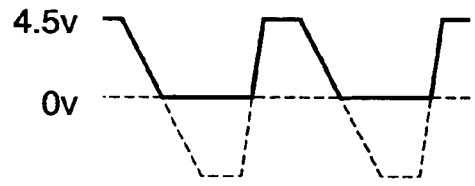
FIG. 16D  D
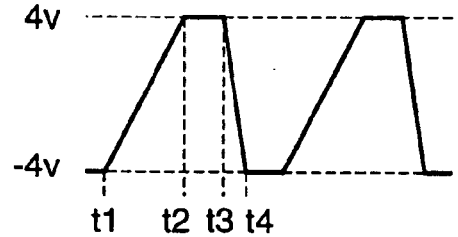

PIEZOELECTRIC ACTUATOR

This application is a divisional of U.S. patent application Ser. No. 09/456,184, filed Dec. 7, 1999 now U.S. Pat. No. 6,703,762, the entire contents of which are hereby incorporated by reference. This application is also based on patent application Hei. 10-359568 filed in Japan, the contents of which are hereby incorporated by reference.

BACKGROUND OF THE INVENTION

1. Field of the Invention

This invention relates to an actuator and a driving apparatus of the actuator, and especially relates to a truss type actuator or an impact type actuator for moving a driven object by utilizing a displacement generated in a piezoelectric device when an alternating driving voltage is applied thereto.

2. Description of the Related Art

A piezoelectric device shows piezoelectric effect for expanding or contracting a displacement substantially in proportion to a level of a voltage when the voltage is applied in a direction parallel to the polarization direction thereof. Thus, a piezoelectric device is conventionally proposed to be used as an actuator for supplying a driving force to a driven object. The piezoelectric device used in the piezoelectric actuator is polarized in unidirectional. Electrodes are provided on both end faces of the piezoelectric device in the polarization direction thereof and output terminals of a driving circuit are connected thereto, so that driving signal from the driving circuit can be applied between the electrodes.

In an impact type piezoelectric actuator, a friction member, which contacts a driven object, is provided to contact an end face of the piezoelectric device in a direction parallel to the direction of the displacement (expansion or contraction) of the piezoelectric device. An impact voltage signal rapidly rising up is applied to the piezoelectric device for quickly expanding (or contracting) the piezoelectric device, so that one of the friction member and the driven object is relatively moved in a direction. Subsequently, another voltage signal slowly falling down is applied to the piezoelectric device for slowly contracting (or expanding) the piezoelectric device, so that the friction member and the driven object are moved in the opposite direction at the same time. Thus, the driven object is moved in a predetermined direction.

In a truss type piezoelectric actuator, two rod-shaped piezoelectric devices are provided for crossing at a predetermined angle, for example, at right angle and a driving member contacting a driven object is provided at a cross point of the piezoelectric devices. Two alternating driving voltages having a phase difference between them are respectively applied to the piezoelectric devices for moving the driving member along an elliptic trail. Thus, the driven object, which is intermittently moved with the driving member, is rotated or linearly moved in a predetermined direction (see, for example, U.S. Pat. No. 4,613,782).

In such the piezoelectric actuator, the displacement (quantity of the expansion and the contraction) can be increased by increasing the level of the voltage applied to the piezoelectric devices. However, when the piezoelectric actuator is used, for example, in a handy type equipment such as a camera, it is difficult to generate a high voltage driving signals for driving the piezoelectric devices, since electric energy of a battery is consumed by electric devices such as a motor for winding a film or for adjusting a position of a taking lens, an electromagnet for controlling shutter speed or for controlling a size of an aperture diaphragm, and so on. Furthermore, a DC/DC converter, a smoothing capacitor, and so on are newly necessary or become larger than the conventional ones for increasing the voltage of the driving signals of the piezoelectric devices. Thus, a configuration of a driving signal generating circuit becomes more complex and larger than the conventional one, so that it is difficult to downsize the equipment using the piezoelectric actuator and to reduce the cost of the driving circuit or the equipment.

For information, in the art of audio equipment, it is conventionally known that an input signal of one of two amplifiers is inverted and output terminals of both of two amplifiers are respectively connected to coils of speakers (Bridge Tied. Load connection) for increasing output power of the speakers. However, such the conventional method merely inverts the audio signal and the object to be applied is the electromagnet which has no relation with respect to the polarization. Thus, it is impossible to apply the conventional method to the piezoelectric device for increasing the output power thereof, since it is necessary to regard the polarization in the piezoelectric device.

SUMMARY OF THE INVENTION

An object of the present invention is to provide an actuator and a driving apparatus thereof, in which voltage of the driving signals of the actuator is maintained in a low level with regard to inversion of the polarization, but the displacement of the actuator can be increased double. Furthermore, the apparatus using the actuator and the driving apparatus can be downsized and be inexpensive.

An actuator driven by a driving apparatus comprises a piezoelectric device serving as a driving source when a driving signal is applied in a polarization direction thereof. A driving apparatus in accordance with an aspect of the present invention comprises: a waveform generator for generating a signal varying corresponding to the passage of time; a first driver for generating a first voltage signal having a maximum voltage smaller than a voltage of inversion of polarization of the piezoelectric device by using the signal from the waveform generator, and for applying the first voltage signal to the piezoelectric device in the polarization direction; and a second driver for generating a second voltage signal having a maximum voltage smaller than the voltage of inversion of polarization of the piezoelectric device and the same polarity as that of the first driving signal by using the signal from the waveform generator, and for applying the second voltage signal to the piezoelectric device in a direction opposite to the polarization direction.

By such a configuration, the piezoelectric device is substantially driven by a driving signal amplified double of the conventional driving signal, so that the displacement of the piezoelectric device becomes substantially double in comparison with the conventional one. However, the voltage of the driving signal can be much smaller than the voltage of the inversion of polarization of the piezoelectric material. The present invention can be applied to both of a truss type actuator and an impact type actuator.

BRIEF DESCRIPTION OF THE DRAWINGS

FIG. 3 is a circuit diagram of the driving apparatus shown in FIG. 2;

FIGS. 4A to 4D are drawings showing waveforms of voltages at points A to D in the circuit shown in FIG. 3;

FIG. 5 is a circuit diagram of a driving apparatus in a second embodiment of the present invention;

FIGS. 6A to 6D are drawings showing waveforms of voltages at points A to D in the circuit shown in FIG. 5;

FIG. 7 is a graph showing characteristic curves showing relations between the voltage of the driving signals and the displacements of the actuator in the embodiments of the present invention;

FIGS. 14A to 14D are drawings showing waveforms of voltages at points A to D in the circuit shown in FIG. 13;

FIG. 15 is a circuit diagram showing a configuration of a driving apparatus in a fourth embodiment of the present invention;

FIGS. 16A to 16D are drawings showing waveforms of voltages at points A to D in the circuit shown in FIG. 15;

FIG. 26 is a circuit diagram showing a configuration of a driving apparatus in a ninth embodiment of the present invention; and.

DETAILED DESCRIPTION OF THE EMBODIMENT

First Embodiment

An actuator and a driving apparatus thereof in a first embodiment of the present invention is described with reference to FIGS. 1, 2, 3 and 4A to 4C.

Figure 1:
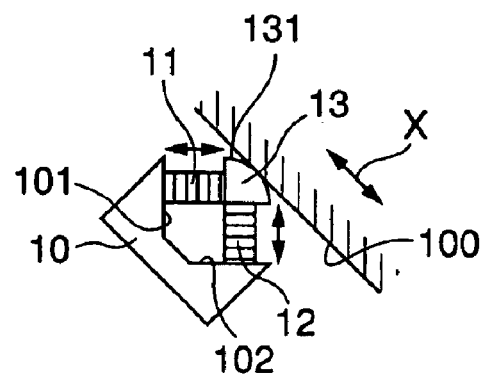
FIG. 1 is a front view showing a configuration of a truss type piezoelectric actuator in a first embodiment of the present invention.

A configuration of a truss type piezoelectric actuator in the first embodiment is shown in FIG. 1. A base member 10 is fixed on a frame of a stationary apparatus (not shown in the figure). The base member 10 has two contacting faces 101 and 102 which will cross at right angle if they are extended. A first piezoelectric device 11 and a second piezoelectric device 12 respectively have substantially the same rectangular parallelepiped shape and the same configuration. Base ends of the first and second piezoelectric devices 11 and 12 are fixed on the contacting faces 101 and 102. Thus, the first and second piezoelectric devices 11 and 12 cross substantially at right angle. A driving member 13 is provided at crossing point of the first and second piezoelectric devices 11 and 12, and fixed on top ends of the first and second piezoelectric devices 11 and 12. As can be seen from FIG. 1, the driving member 13 has a fan shaped cross-section having an interior angle about 90 degrees and having a predetermined thickness perpendicular to a paper sheet of FIG. 1. An outer cylindrical surface 131 of the driving member 13 having a predetermined friction coefficient by a surface treatment is disposed for facing outside. A driven object 100 contacts the cylindrical surface 131 of the driving member 13 with a predetermined pressure, so that is can be moved in a direction shown by arrow X by a elliptical movement of the driving member 13.

The first and second piezoelectric devices 11 and 12 are configured by piling up of a plurality of ceramic thin plates such as PZT (Pb, Zr, Ti) showing piezoelectric characteristic and two (first and second) groups of electrodes, alternately. The ceramic thin plates and the electrodes are fixed by adhesive. The first and second groups of the electrodes are respectively connected to a positive and a negative terminals of a driving electric power source via cables.

When a predetermined voltage is applied between the first and second groups of the electrodes, electric fields are generated in respective ceramic thin plates disposed between an electrode in the first group and an electrode in the second group in a direction parallel to the piling up of the ceramic thin plates and the electrodes. The directions of the electric fields are alternately the same direction. The ceramic thin plates are piled in a manner so that the polarization of them are alternately the same direction. In other words, the polarization direction of the adjoining two ceramic thin plates are opposite to each other. Thus, all the ceramic thin plates can be displaced in the same direction even when the same driving signal is applied to the first and second groups of the electrodes.

Figure 2:
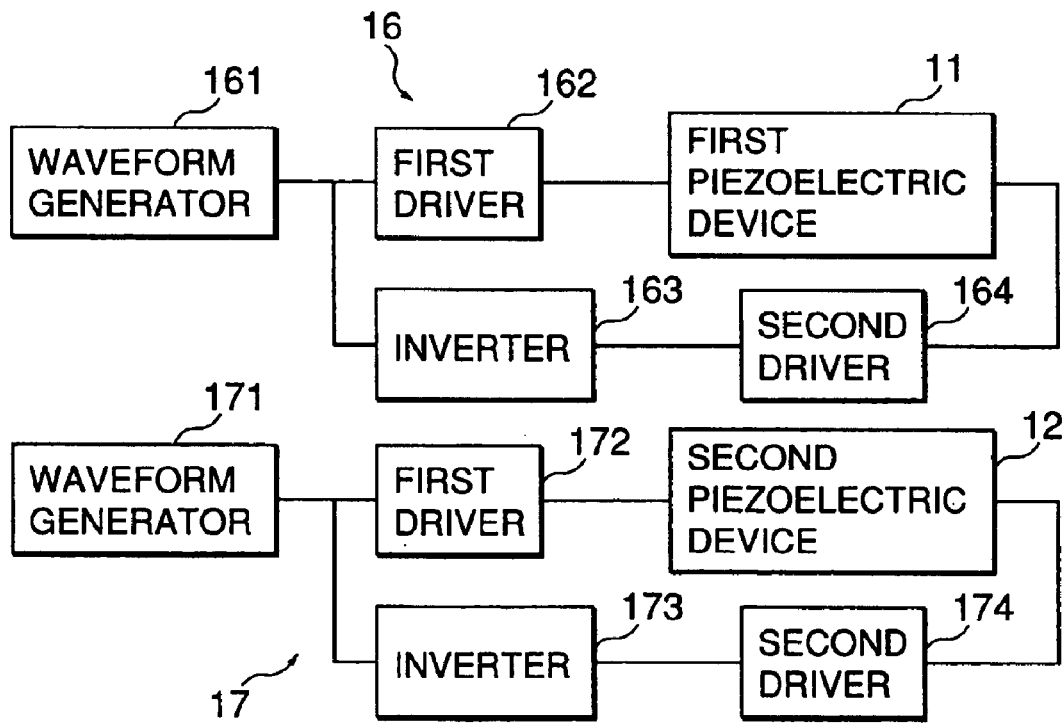
FIG. 2 is a block diagram of a driving apparatus in the first embodiment suitable for driving the truss type piezoelectric actuator.

A block diagram of a driving apparatus in the first embodiment which is suitable for the truss type piezoelectric actuator is shown in FIG. 2. A first driving circuit 16 is connected to the first piezoelectric device 11, and a second driving circuit 17 is connected to the second piezoelectric device 12. The first driving circuit 16 comprises a waveform generator 161, a first driver 162, an inverter 163 and a second driver 164. An output terminal of the first driver 162 is connected to a terminal of the first piezoelectric devices 11, and an output terminal of the second driver 164 is connected to the other terminal of the first piezoelectric device 11.

Similarly, the second driving circuit 17 comprises a waveform generator 171, a first driver 172, an inverter 173 and a second driver 174. An output terminal of the first driver 172 is connected to a terminal of the second piezoelectric devices 12, and an output terminal of the second driver 174 is connected to the other terminal of the second piezoelectric device 12. Phases of driving signals outputted from the wave for generator 161 and 171 are different, as described below.

A circuit diagram of the first driving circuit 16 is shown in FIG. 3. The second driving circuit 17 has substantially the same configuration, so that the illustration and the description of the second driving circuit 17 are omitted. The first driver 162 is configured by an operational amplifier OP11, resistors R11 and R12, and a constant voltage power supply B11. The inverter 163 and the second driving circuit 164 are integrally configured by an operational amplifier OP12, resistors R13 and R14, and a constant voltage power supply B12. In the first embodiment, the operational amplifiers OP11 and OP12 are respectively connected to a conventional constant voltage power supply for supplying a voltage of 5V. The output voltage of the constant voltage power supply B11 is set to be 0.5V, and that of the constant voltage power supply B12 is set to be 1.83V.

A noninverting input terminal of the operational amplifier OP11 is connected to an output terminal of the waveform generator 161, and an inverting input terminal thereof is connected to the constant voltage power supply B11 via the resistor R12. Furthermore, the resistor R11 is connected between an output terminal and the inverting input terminal of the operational amplifier OP11 for feedback. The output terminal of the operational amplifier OP11 is connected to one group of the electrodes of the first piezoelectric device 11. Thus, an amplification factor $\alpha$ of the operational amplifier OP11 becomes double corresponding to a relation $\alpha = (1 + R11/R12)$, and the phase of the output signal from the operational amplifier OP11 becomes the same as that of the input signal.

A noninverting input terminal of the operational amplifier OP12 is connected to the constant voltage power supply B12, and an inverting input terminal thereof is connected to the output terminal of the waveform generator 161 via the resistor R14. Furthermore, the resistor R13 is connected between an output terminal and the inverting input terminal of the operational amplifier B12 for feedback. The output terminal of the operational amplifier OP12 is connected to the other group of the electrodes of the first piezoelectric device 11. Thus, an amplification factor $\beta$ of the operational amplifier OP12 becomes double corresponding to a relation $\beta = (-R13/R14)$, and the phase of the output signal from the operational amplifier OP12 is inverted. When the input signal is alternating such as a sine wave, the phase of the output signal from the operational amplifier OP12 becomes negative with respect to that from the operational amplifier OP11.

An operation of the driving apparatus in the first embodiment is described with reference to FIGS. 4A to 4D. FIGS. 4A, 4B and 4C respectively show waveforms of voltage signals at points A, B and C in FIG. 3. FIG. 4D shows a waveform of a driving signal (hereinafter abbreviated as driving signal D) applied to the piezoelectric device 11 shown by arrow D in FIG. 3.

The waveform generator 161 generates a sine wave shown in FIG. 4A (hereinafter abbreviated as sine wave A), in which the voltage of the sine wave varied in a range between 0.5V and 2.5V for considering the stability of the operation of the circuit. The operational amplifier OP11 amplifies the sine wave A and outputs an amplified driving signal shown in FIG. 4B (hereinafter abbreviated as driving signal B) having the same phase as that of the sine wave A. The voltage of the driving signal B is varied in a range between 0.5V and 4.5V. The operational amplifier OP12 amplifies the sine wave A and outputs an amplified driving signal shown in FIG. 4C (hereinafter abbreviated as driving signal C) having the negative phase with respect to that of the sine wave A. The voltage of the driving signal C is varied in a range between 0.5V and 4.5V having the same polarity as that of the driving signal B.

The driving signal B from the operational amplifier OP11 is applied to the (first) piezoelectric device 11 in the same direction as the polarization direction of the ceramic thin plates constituting the piezoelectric device 11. On the other hand, the driving signal C from the operational amplifier OP12 is applied to the piezoelectric device 11 in a direction opposite to the polarization direction. When the piezoelectric device 11 is expanded by the driving signal B from the operational amplifier OP11, the driving signal C from the operational amplifier OP12 is applied to the piezoelectric device 11 in a direction for contracting it, and vice versa. Thus, it is substantially equivalent that the driving signal D shown in FIG. 4D is applied to the piezoelectric device 11. As mentioned above, two driving signals B and C having the same polarity and the same voltage variation of 4V (0.5V to 4.5V) is respectively applied to the same piezoelectric device 11 in opposite directions, so that the maximum displacement of the piezoelectric device 11 can be increased to the same level as that when the voltage variation of the driving signal B or C is amplified double (8V: −4V to +4V).

Characteristic curves showing relations between the voltages applied to the piezoelectric device (abscissa) and the displacements of the piezoelectric device (ordinates) are shown in FIG. 7. In this embodiment, a known material showing the inversion of the polarization at the voltage of −20V or +20V is used as the material of the ceramic thin plates. A predetermined voltage larger than 20V is applied to the ceramic thin plates for polarizing the direction of axes of crystals contained in the ceramic thin plates. The ceramic thin plates are piled in a manner so that the polarization of them are alternately the same direction. Furthermore, the electrodes connected to positive and negative terminals of the driving electric power source are alternately piled up.

As mentioned above, the level of the voltage applied to the piezoelectric devices 11 and 12 is in a range between −4V and +4V in the polarization direction, so that the level or absolute value of the voltage of the driving signal of the piezoelectric device (−4V to +4V) is sufficiently smaller than that of the voltage of the inversion of the polarization of the ceramic thin plates (−20V or +20V). Thus, there is no problem of the linearity of the relation between the displacement of the piezoelectric device and the voltage applied thereto.

In case that the polarization of the ceramic thin plates is treated at the voltage of +20V, the larger the voltage applied to the piezoelectric devices 11 and 12 increases from 0V to +4V, the larger the displacement or quantity of the expansion of the piezoelectric device increases from the standard point O of the displacement (along the line designated by C1 but in the opposite direction of the arrow). Alternatively, the smaller the voltage applied to the piezoelectric devices 11 and 12 decreases from 0V to −4V, the larger the displacement or quantity of the contraction of the piezoelectric device increases from the standard point O of the displacement (along the line designated by C1 and in the same direction of the arrow).

In case that the polarization of the ceramic thin plates is treated at the voltage of −20V, the smaller the voltage applied to the piezoelectric devices 11 and 12 decreases from 0V to −4V, the larger the displacement or quantity of the expansion of the piezoelectric device increases from the standard point O of the displacement (along the line designated by C2 but in the opposite direction of the arrow). Alternatively, the larger the voltage applied to the piezoelectric devices 11 and 12 increases from 0V to +4V, the larger the displacement or quantity of the contraction of the piezoelectric device increases from the standard point O of the displacement (along the line designated by C2 and in the same direction of the arrow).

The second driving circuit 17 generates a driving signal having a predetermined phase difference such as 90 degrees advanced or delayed with respect to the driving signal D shown in FIG. 4D. Since the first piezoelectric device 11 and the second piezoelectric device 12 are respectively driven by sine wave driving signals having the phase difference of 90 degrees between them, the driving member 13 is moved for trailing an ellipse (including a circle). As a result, the driven object 100 contacting the driving member 13 with the predetermined pressure will be moved in the direction shown in by arrow X in FIG. 1. For moving the driven object 100 in the opposite direction, the phase difference between the driving signal of the first piezoelectric device 11 and that of the second piezoelectric device 12 is switched advance delay. The phase difference between the driving signals is preferably 90 degrees but not restricted by this value.

Second Embodiment

An actuator and a driving apparatus thereof in a second embodiment of the present invention is described with reference to FIGS. 5 and 6A to 6C. A configuration of a truss type piezoelectric actuator and a block diagram of a driving apparatus in the second embodiment are substantially the same as those in the first embodiment, so that the illustration and the description of them are omitted.

A circuit diagram of a first driving circuit 26 of the driving apparatus in the second embodiment is shown in FIG. 5. A second driving circuit 27 has substantially the same configuration as that of the first driving circuit 26, so that the illustration and the description of the second driving circuit 27 are omitted. A first driver 262 is configured by an operational amplifier OP21, resistors R21 and R22, and a constant voltage power supply B21. An inverter 263 and a second driving circuit 264 are integrally configured by an operational amplifier OP22, resistors R23 and R24, and a constant voltage power supply B22. In the second embodiment, the operational amplifiers OP21 and OP22 are respectively connected to a conventional constant voltage power supply for supplying a voltage of 5V. The output voltage of the constant voltage power supply B21 is set to be 1.83V, and that of the constant voltage power supply B22 is set to be 1.3V.

A noninverting input terminal of the operational amplifier OP21 is connected to an output terminal of the waveform generator 261, and an inverting input terminal thereof is connected to the constant voltage power supply B21 via the resistor R22. Furthermore, the resistor R21 is connected between an output terminal and the inverting input terminal of the operational amplifier OP21 for feedback. The output terminal of the operational amplifier OP21 is connected to one group of the electrodes of the first piezoelectric device 21. Thus, an amplification factor γ of the operational amplifier OP21 becomes quadruple corresponding to a relation γ=(1+R21/R22), and the phase of the output signal from the operational amplifier OP21 becomes the same as that of the input signal.

A noninverting input terminal of the operational amplifier OP22 is connected to the constant voltage power supply B22, and an inverting input terminal thereof is connected to the output terminal of the waveform generator 261 via the resistor R24. Furthermore, the resistor R23 is connected between an output terminal and the inverting input terminal of the operational amplifier B22 for feedback. The output terminal of the operational amplifier OP22 is connected to the other group of the electrodes of the first piezoelectric device 21. Thus, an amplification factor Δ of the operational amplifier OP22 becomes quadruple corresponding to a relation Δ=(−R23/R24), and the phase of the output signal from the operational amplifier OP22 is inverted. When the input signal is alternating, the phase of the output signal from the operational amplifier OP22 becomes negative with respect to that from the operational amplifier OP21.

An operation of the driving apparatus in the second embodiment is described with reference to FIGS. 6A to 6D. FIGS. 6A, 6B and 6C respectively show waveforms of voltage signals at points A, B and C in FIG. S. FIG. 6D shows a waveform of a driving signal (hereinafter abbreviated as driving signal D) applied to the piezoelectric device 21 shown by arrow D in FIG. 5.

The waveform generator 261 generates a sine wave shown in FIG. 6A (hereinafter abbreviated as sine wave A), in which the voltage of the sine wave varied in a range between 0.5V and 2.5V for considering the stability of the operation of the circuit. The operational amplifier OP21 amplifies an input signal corresponding to the sine wave A and outputs a half-wave rectified sine wave shown in FIG. 6B (hereinafter abbreviated as driving signal B) with the same phase as that of the input signal, in which the voltage of the driving signal B is varied in a range between 0.5V and 4.5V. The operational amplifier OP22 amplifies an input signal corresponding to the sine wave A and outputs a half-wave rectified sine wave shown in FIG. 6C (hereinafter abbreviated as driving signal C) with the negative phase with respect to that of the input signal, in which the voltage of the driving signal C is varied in a range between 0.5V and 4.5V.

In the second embodiment, the amplification factors r and A of the operational amplifiers OP21 and OP22 are respectively set to be quadruple, and the phases of the driving signals B and C are negative with each other. Furthermore, the voltages of the constant voltage power supplies B21 and B22 are adjusted so as to apply only the positive voltages in alternating driving signals (actually, larger than +0.5V for stabilizing the driving circuit). Thus, it is substantially equivalent that the driving signal D shown in FIG. 6D, which is amplified double in comparison with the conventional driving signal, is applied to the piezoelectric device 21.

Third Embodiment

An actuator and a driving apparatus thereof in a third embodiment of the present invention is described with reference to FIGS. 8, 9, 10. 11, 12, 13 and 14A to 14C.

Figure 8:
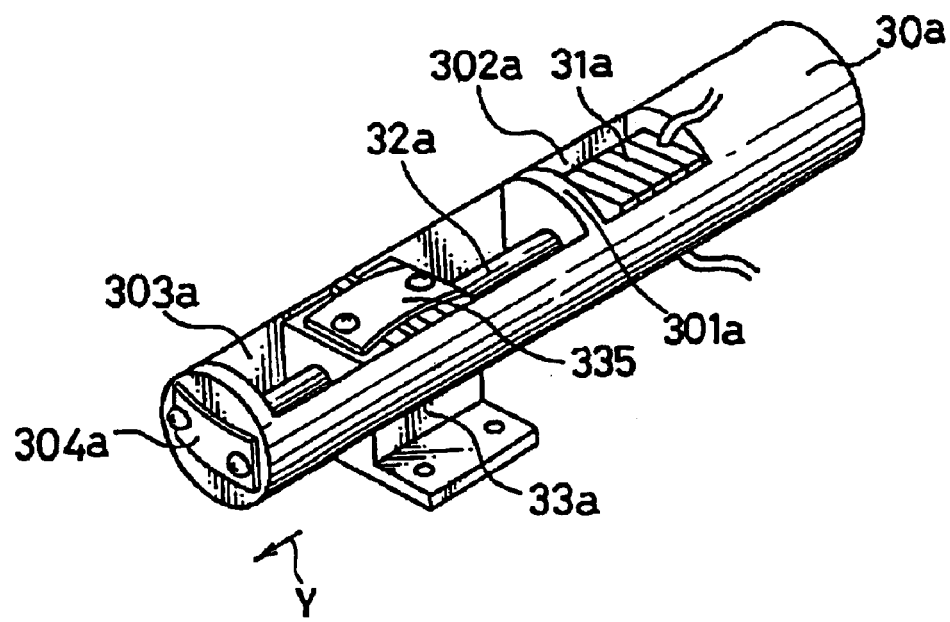
FIG. 8 is a perspective view showing a configuration of an impact type piezoelectric actuator in a third embodiment of the present invention.
Figure 9:
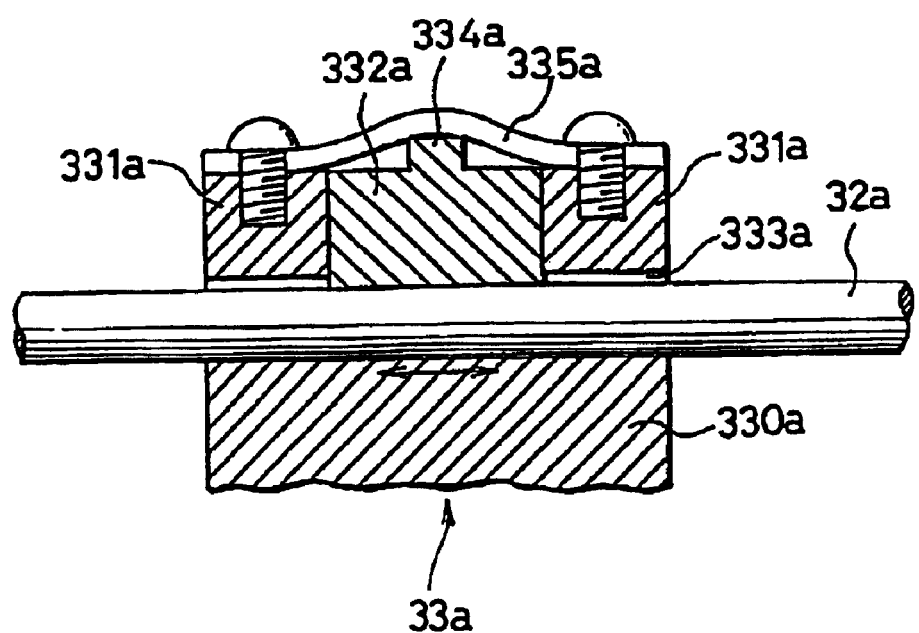
FIG. 9 is a cross-sectional front view showing a configuration of a part of the actuator shown in FIG. 8.

A configuration of an impact type piezoelectric actuator in the third embodiment is shown in FIGS. 8 and 9. In FIG. 8, a rod shaped stationary member (first unit) 30a is hollowed except both ends and a center partition 301a for forming a first cavity 302a and a second cavity 303a. A piezoelectric device 31a is provided in the first cavity 302a in a manner so that a direction of piling up of the ceramic thin plates coincides with an axis of the stationary member 30a and the base end of the piezoelectric device 31a is fixed on the stationary member 30a. A sliding rod 32a and a slider (second unit) 33a which is engaged with outer cylindrical face of the sliding rod 32a are provided in the second cavity 303a. The sliding rod 32a penetrates holes serving as bearings of the sliding rod 32a and formed on the center partition 301a and the end face of second cavity 303a of the stationary member 30a. An end of the sliding rod 32a contacts a top end of the piezoelectric device 31a and the other end of the sliding rod 32a penetrates and protrudes a little from the stationary member 30a. Thus, the sliding rod 32a is movable in the axial direction thereof shown by arrow Y in FIG. 8.

As can be seen from FIG. 9, the slider 33a comprises a base member 330a, a friction member 332a and a plate spring 335a. The base member 330a has two walls 331a formed on both ends thereof in a direction parallel to the axis of the sliding rod 32a. The friction member 332a has a protrusion 334a contacting the plate spring 335a and receiving a pressure from the plate spring 335a. A bearing hole 333 having a circular cross-section is formed on each wall 331a through which the sliding rod 32a penetrates. Circular concave faces having the same radius are respectively formed on a portion of the friction member 332a and on a portion of the base member 330a between the walls 331a for facing each other. The sliding rod 32a is nipped between the base member 330a and the friction member 332a by a pressure of the plate spring 335a. Another plate spring 304a is provided on the outer face of the end of the second cavity 303a of the stationary member 30a for applying a pressing force to the sliding rod 32a toward the piezoelectric device 31a in the axial direction thereof (see FIG. 8).

By such a configuration, the sliding rod 32a is held by the slider 33a with a pressure suitable for impact sliding motion. When the sliding rod 32a is quickly moved in a first direction by the displacement of the piezoelectric device 31a, the slider 33a can not move with the sliding rod 32a due to inertia thereof. Thus, the slider 33a relatively slides on the sliding rod 32a. On the other hand, when the sliding rod 32a is slowly moved in a second direction opposite to the first direction by the displacement of the piezoelectric device 31a, the slider 33a can move with the sliding rod 32a by the friction force generated between them. By repeating these motions, the slider 33a is moved in the second direction. Detailed description of the movement of the actuator will be described below.

Figure 10:
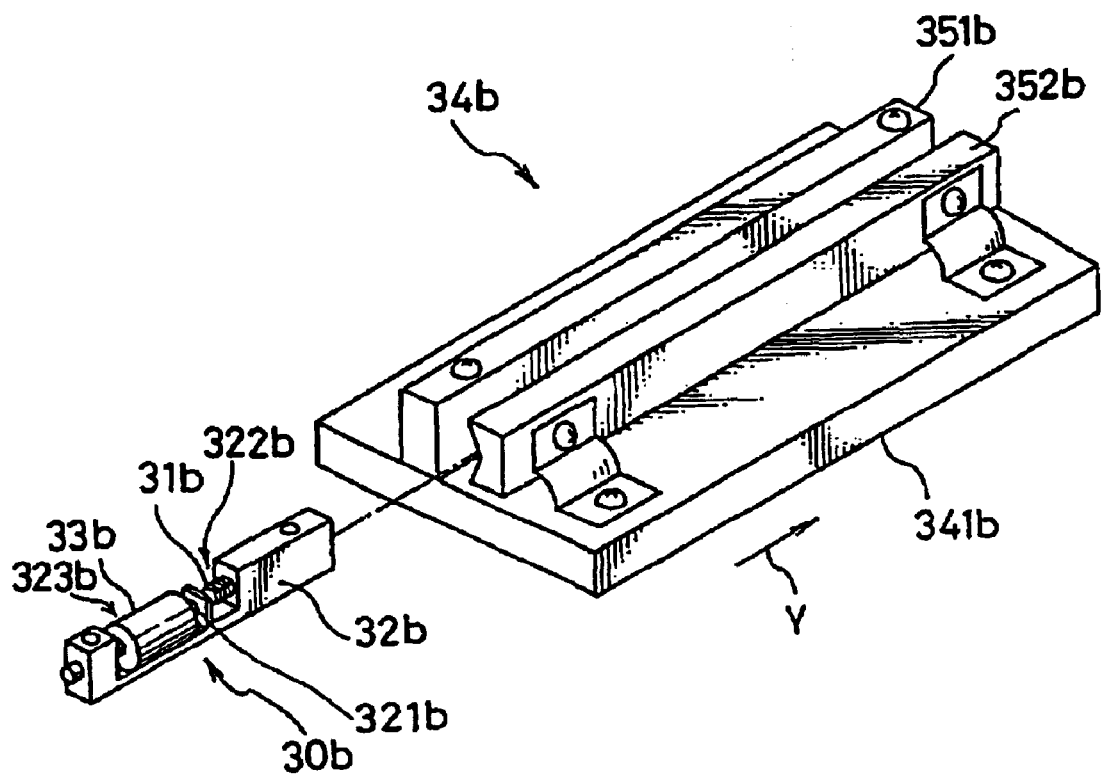
FIG. 10 is a perspective view showing a configuration of a modification of the impact type piezoelectric actuator in the third embodiment.
Figure 11:
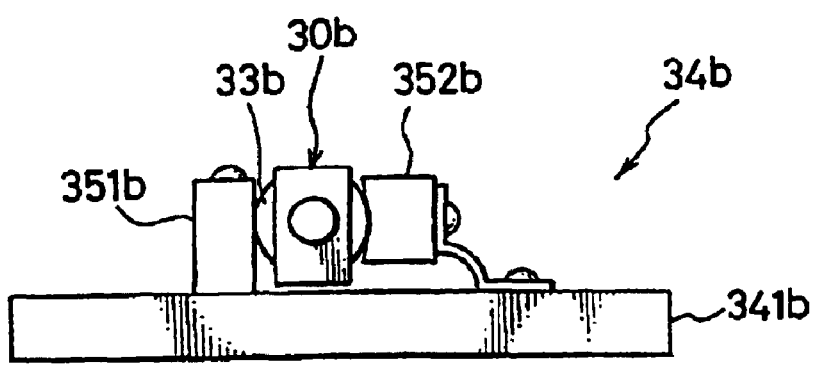
FIG. 11 is a side view of the actuator shown in FIG. 10.

A modified configuration of the impact type piezoelectric actuator in the third embodiment is shown in FIGS. 10 and 11. FIG. 10 illustrates a condition that a driving unit (first unit) 30b is detached from a stationary unit (second unit) 34b. The stationary unit 34b is configured by a flat base member 341b and two slender guide members 351b and 352b. The guide members 351b and 352b are disposed on the base member 341b in parallel with each other with a predetermined gap. The guide member 352b has an angular or a circular concave groove on a side facing the other guide member 351b for serving as a stopper of the moving unit in upper direction with respect to the base member 341b.

The driving unit 30b comprises a piezoelectric device 31b, a frame 32b for holding the piezoelectric device 31b and a slider 33b. The frame 32b has a rod shape with a first space 322b and a second space 332b separated by a partition 321b. The piezoelectric device 31b is provided in the first space 322b in a manner so that a direction of piling up of the ceramic thin plates coincides with the lengthwise direction of the frame 32b and the base end of the piezoelectric device 31b is fixed on the frame 32b. A cylindrical shaped slider 33b having a shaft is provided in the second space 323b. The outer diameter of the cylindrical shape of the slider 33b substantially coincides with the widest gap between the guide members 351b and 352b. The shaft of the slider 33b penetrates holes servings as bearings of the shaft and are formed on the center partition 321b and the end face of the second space 323b of the frame 32b. An end of the shaft of the slider 33b contacts a top end of the piezoelectric device 31b with a predetermined pressure by a pressing member such as a spring not shown in the figure. Thus, the slider 33b is movable in the lengthwise direction of the frame 32b shown by arrow Y in FIG. 10.

Figure 12:
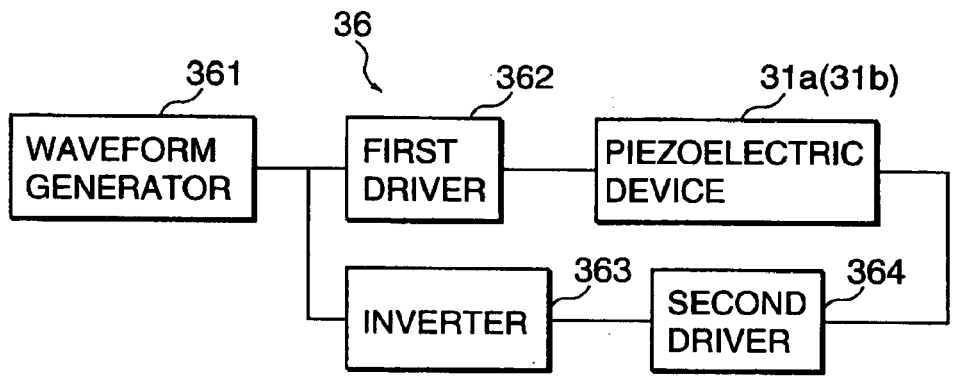
FIG. 12 is a block diagram of a driving apparatus in the third embodiment suitable for driving the impact type piezoelectric actuator.

A block diagram of a driving apparatus in the third embodiment suitable for the impact type piezoelectric actuator is shown in FIG. 12. The piezoelectric device 31a or 31b is connected to a driving apparatus 36. The driving apparatus 36 comprises a waveform generator 361, a first driver 362, an inverter 363 and a second driver 364. An output terminal of the first driver 362 is connected to a terminal of the piezoelectric device 31a or 31b, and an output terminal of the second driver 364 is connected to the other terminal of the piezoelectric device 31a or 31b.

Figure 13:
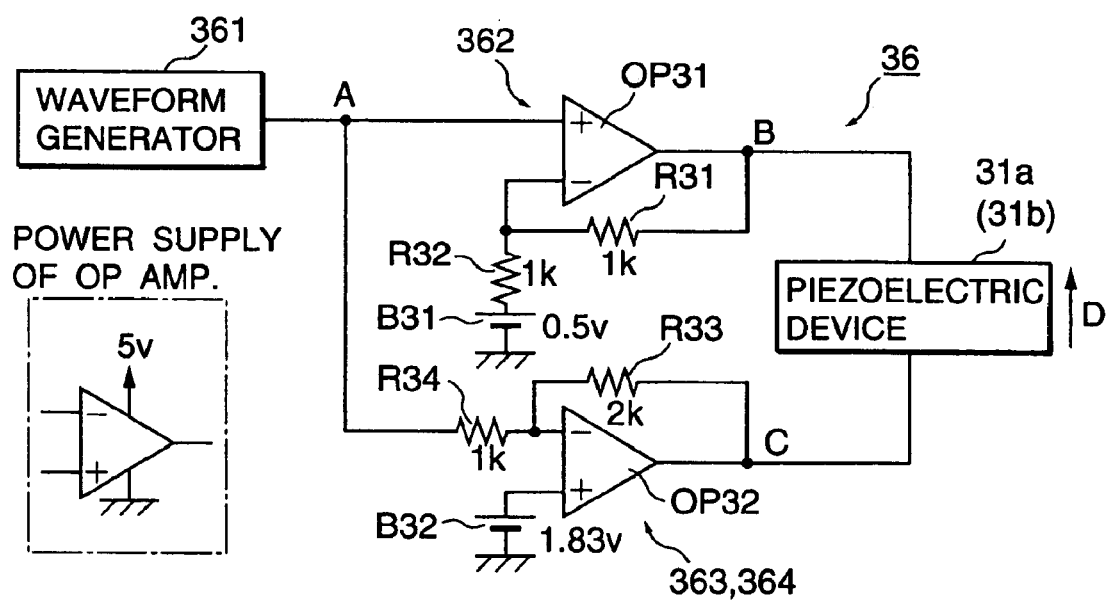
FIG. 13 is a circuit diagram of the driving apparatus shown in FIG. 12.

A circuit diagram of the driving apparatus 36 is shown in FIG. 13. The first driver 362 is configured by an operational amplifier OP31, resistors R31 and R32, and a constant voltage power supply B31. The inverter 363 and the second driving circuit 364 are integrally configured by an operational amplifier OP32, resistors R33 and R34, and a constant voltage power supply B32. In the third embodiment, the operational amplifiers OP31 and OP32 are respectively connected to a conventional constant voltage power supply for supplying a voltage of 5V. The output voltage of the constant voltage power supply B31 is set to be 0.5V, and that of the constant voltage power supply B32 is set to be 1.83V, similarly to the first embodiment.

The waveform generator 361 generates a sawtooth wave (including a triangular wave and a trapezium wave) shown in FIG. 14A, in which the inclination in the rising up portion is different from that in the falling down portion.

A noninverting input terminal of the operational amplifier OP31 is connected to an output terminal of the waveform generator 361, and an inverting input terminal thereof is connected to the constant voltage power supply B31 via the resistor R32. Furthermore, the resistor R31 is connected between an output terminal and the inverting input terminal of the operational amplifier OP31 for feedback. The output terminal of the operational amplifier OP11 is connected to one group of the electrodes of the first piezoelectric device 31a or 31b. Thus, an amplification factor $\epsilon$ of the operational amplifier OP31 becomes double corresponding to a relation $\epsilon=(1+R31/R32)$, and the phase of the output signal from the operational amplifier OP31 becomes the same as that of the input signal.

A noninverting input terminal of the operational amplifier OP32 is connected to the constant voltage power supply B32, and an inverting input terminal thereof is connected to the output terminal of the waveform generator 361 via the resistor R34. Furthermore, the resistor R33 is connected between an output terminal and the inverting input terminal of the operational amplifier B32 for feedback. The output terminal of the operational amplifier OP32 is connected to the other group of the electrodes of the first piezoelectric device 31a or 31b. Thus, an amplification factor $\zeta$ of the operational amplifier OP32 becomes double corresponding to a relation $\zeta C=(-R33/R34)$, and the phase of the output signal from the operational amplifier OP32 is inverted. When the input signal is alternating, the phase of the output signal from the operational amplifier OP32 becomes negative with respect to that from the operational amplifier OP31.

An operation of the driving apparatus in the third embodiment is described with reference to FIGS. 14A to 14D.

FIGS. 14A, 14B and 14C respectively show waveforms of voltage signals at points A, B and C in FIG. 13. FIG. 14D shows a waveform of a driving signal (hereinafter abbreviated as driving signal D) applied to the piezoelectric device 31a or 31b shown by arrow D in FIG. 13.

The waveform generator 361 generates a sawtooth wave shown in FIG. 14A (hereinafter abbreviated as sawtooth wave A), in which the voltage of the sine wave varied in a range between 0.5V and 2.5V. The operational amplifier OP31 amplifies the sawtooth wave A and outputs a driving signal shown in FIG. 14B (hereinafter abbreviated as driving signal B) with the same phase as that of the sawtooth wave A. The voltage of the driving signal B is varied in a range between 0.5V and 4.5V. The operational amplifier OP32 amplifies the sawtooth wave A and outputs an amplified driving signal shown in FIG. 14C (hereinafter abbreviated as driving signal C) with the negative phase with respect to that of the sawtooth wave A. The voltage of the driving signal C is varied in a range between 0.5V and 4.5V with the same polarity as that of the driving signal B. Thus, it is substantially equivalent that the driving signal D shown in FIG. 14D is applied to the piezoelectric device 31a br 31b. As mentioned above, two driving signals B and C having the same polarity and the same voltage variation of 4V (0.5V to 4.5V) is respectively applied to the same piezoelectric device 31a or 31b in opposite directions, so that the maximum displacement of the piezoelectric device 31a or 31b can be increased to the same level as that when the voltage variation of the driving signal B or C is amplified double (8V: −4V to +4V).

The movement of the impact type piezoelectric actuator shown in FIGS. 8 and 9 is described. In a time period t1 to t2 in the driving signal D shown in FIG. 14D, the voltage of the driving signal gradually increases from −4V to +4V. The piezoelectric device 31a slowly expands, and the sliding rod 32a is slowly moved in a direction shown by arrow Y in FIG. 8 against the pressure of the plate spring 304a. At this time, since the moving speed of the sliding rod 32a is slow, the slider 33a is moved with the sliding rod 32a in the direction shown by arrow Y due to the friction force generating between the contacting faces of the sliding rod 32a and the slider 33a. When the time reaches to t2, the voltage of the driving signal D will be maintained at +4V until the time reaches to t3, so that the sliding rod 32a and the slider 33a are stopped at the position. When the time reaches to t3, the voltage of the driving signal D rapidly decreases from +4V to −4V. Since the piezoelectric device rapidly contracts corresponding to the falling down of the voltage, the sliding rod 32a is quickly moved in the direction opposite to the direction shown by arrow Y. The slider 33a, however, has been stopped at the position because the inertia of the slider 33a overcomes the friction force between the sliding rod 32a and the slider 33a. As a result, the slider 33a is moved a predetermined distance in the direction shown by arrow Y during one cycle of the driving signal D. By repeating the application of the driving signal D to the piezoelectric device 31a, the slider 33a is intermittently moved in the direction shown by arrow Y. For moving the slider 33a in the direction opposite to the direction shown by arrow Y, a sawtooth wave having the waveform of rapidly rising up and slowly falling down is generated by the waveform generator 361.

In the above-mentioned description, it is supposed that the slider 33a does not slide on the sliding rod 32a when the movement of the siding rod 32a is slow. The slider 33a, however, actually slides on the sliding rod 32a even when the movement of the sliding member 32a is slow corresponding to the intensity of the friction force between the sliding rod 32a and the slider 33a. In the latter case, the intensity of the force acting on the slider 33a by the sliding rod 32a is different corresponding to the direction of the movement of the sliding rod 32a, since the moving speed of the sliding rod 32a is different corresponding to the direction of the movement. As a result, the slider 33a can be moved (see Publication Gazette of Unexamined Japanese Patent Application Hei 7-298656).

Subsequently, the movement of the impact type piezoelectric actuator shown in FIGS. 10 and 11 is described. In a time period t1 to t2 in the driving signal D shown in FIG. 14D where the voltage of the driving signal gradually increases from −4V to +4V, the piezoelectric device 31b slowly expands, and the slider 33b should be moved in a direction opposite to the direction shown by arrow Y in FIG. 10. At this time, since the speed of the expansion of the piezoelectric device 31b is slow, the force acting on the contact faces of the slider 33b and the guide members 351b and 352b is smaller than the static friction force between them, so that the slider 33b cannot be moved with respect to the guide members 351b and 352b. As a result, the base member 32b of the driving unit 30b relatively moves in the direction shown by arrow Y. When the time reaches to t2, the voltage of the driving signal D will be maintained at +4V until the time reaches to t3, so that the base member 32b of the driving unit 30b stops at the position. When the time reaches to t3, the voltage of the driving signal D rapidly decreases from +4V to −4V. Since the piezoelectric device rapidly contracts corresponding to the falling down of the voltage, the slider33b is quickly moved in the direction shown by arrow Y. At this time, the force acting on the contact faces of the slider 33b and the guide members 351b and 352b is larger than the dynamic friction force between them, so that the slider 33a returns to an initial position on the driving unit 30b. As a result, the driving unit 30b moves a predetermined distance in the direction shown by arrow Y during one cycle of the driving signal D. By repeating the application of the driving signal D to the piezoelectric device 31b, the driving unit 30b intermittently moves in the direction shown by arrow Y. For moving the driving unit 30b in the direction opposite to the direction shown by arrow Y, a sawtooth wave having the waveform of rapidly rising up and slowly falling down is generated by the waveform generator 361.

Fourth Embodiment

An actuator and a driving apparatus thereof in a fourth embodiment of the present invention is described with reference to FIGS. 15 and 16A to 16C. A configuration of an impact type piezoelectric actuator and a block diagram of a driving apparatus in the fourth embodiment are substantially the same as those in the third embodiment, so that the illustration and the description of them are omitted.

A circuit diagram of a driving apparatus 46 in the fourth embodiment is shown in FIG. 15. A first driver 462 is configured by an operational amplifier OP41, resistors R41 and R42, and a constant voltage power supply B41. An inverter 463 and a second driving circuit 464 are integrally configured by an operational amplifier OP42, resistors R43 and R44, and a constant voltage power supply B42. In the fourth embodiment, the operational amplifiers OP41 and OP42 are respectively connected to a conventional constant voltage power supply for supplying a voltage of 5V. The output voltage of the constant voltage power supply B41 is set to be 1.83V, and that of the constant voltage power supply B42 is set to be 1.3V.

A noninverting input terminal of the operational amplifier OP41 is connected to an output terminal of a waveform generator 461, and an inverting input terminal thereof is connected to the constant voltage power supply B41 via the resistor R42. Furthermore, the resistor R41 is connected between an output terminal and the inverting input terminal of the operational amplifier OP41 for feedback. The output terminal of the operational amplifier OP41 is connected to one group of the electrodes of the first piezoelectric device 31*a* or 31*b*. Thus, an amplification factor η of the operational amplifier OP41 becomes quadruple corresponding to a relation η=(1+R41/R42), and the phase of the output signal from the operational amplifier OP41 becomes the same as that of the input signal.

A noninverting input terminal of the operational amplifier OP42 is connected to the constant voltage power supply B42, and an inverting input terminal thereof is connected to the output terminal of the waveform generator 461 via the resistor R44. Furthermore, the resistor R43 is connected between an output terminal and the inverting input terminal of the operational amplifier B42 for feedback. The output terminal of the operational amplifier OP42 is connected to the other group of the electrodes of the first piezoelectric device 31*a* or 31*b*. Thus, an amplification factor θ of the operational amplifier OP42 becomes quadruple corresponding to a relation θ=(−R43/R44), and the phase of the output signal from the operational amplifier OP42 is inverted. When the input signal is alternating such as a sine wave, the phase of the output signal from the operational amplifier OP42 becomes negative with respect to that from the operational amplifier OP41.

FIGS. 16A, 16B and 16C respectively show waveforms of voltage signals at points A, B and C in FIG. 15. FIG. 16D shows a waveform of a driving signal applied to the piezoelectric device 31*a* or 31*b* shown by arrow D in FIG. 15. An operation of the fourth embodiment by the driving signal D is substantially the same as that of the above-mentioned third embodiment, so that the description of the operation of the fourth embodiment is omitted.

Fifth Embodiment

A driving apparatus suitable in a fifth embodiment of the present invention is described with reference to FIGS. 17, 18A to 18D and 19. The driving apparatus in the fifth embodiment is suitable for driving the impact type piezoelectric actuators in the third embodiment shown in FIGS. 8 to 11.

Figure 17:
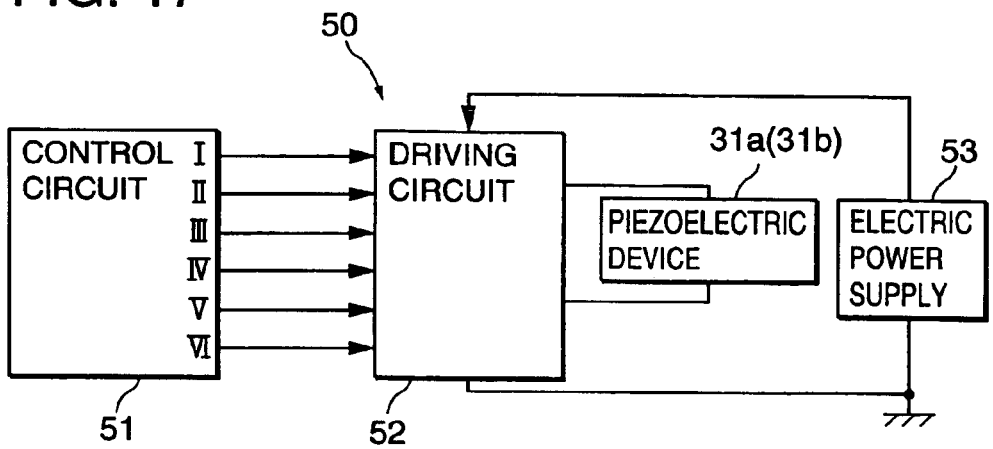
FIG. 17 is a block diagram showing a configuration of a driving apparatus in a fifth embodiment of the present invention.

A block diagram of the driving apparatus in the fifth embodiment is shown in FIG. 17. The driving apparatus 50 comprises a control circuit 51, a driving circuit 52 and an electric power supply 53. A driving signal generated by the driving circuit 52 is applied to the piezoelectric device 31*a* or 31*b*. The control circuit 51 outputs switching signals I to VI shown in FIG. 19 corresponding to control signals to the driving circuit 52. The driving circuit 52 charges and discharges the electric charge from the electric power supply into and from the piezoelectric device 31*a* or 31*b* corresponding to the control signals I to VI from the control circuit 51. When the piezoelectric device 31*a* or 31*b* is regarded as a capacitor, the voltages between the electrodes of the piezoelectric device 31*a* or 31*b* is in proportion to the quantity of the electric charge in the piezoelectric device 31*a* or 31*b*. Thus, by changing the speeds for charging and discharging of the electric charge into and from the piezoelectric device 31*a* or 31*b*, a sawtooth wave driving signal shown in FIG. 19 can be applied to the piezoelectric device 31*a* or 31*b*.

Circuit diagrams in the driving circuit 52 is shown in FIGS. 18A to 18D. As can be seen from FIG. 18A, four circuits are provided between the electric power supply 53 and the ground, in which the circuits are connected to the piezoelectric device 31*a* or 31*b* for configuring a series circuit. Symbols P+ and P− added to the piezoelectric device 31*a* or 31*b* show the electrodes standardized by the polarization direction of the ceramic thin plate of the piezoelectric device.

A first circuit is configured by a constant current circuit 521 for supplying a predetermined limited current to the piezoelectric device 31*a* or 31*b* and a switching circuit 526. The first circuit serves as a discharge circuit for gradually discharging the electric charge from the piezoelectric device 31*a* or 31*b* in a direction from the electrode P+ to the electrode P−.

A second circuit is configured by switching circuits 522 and 526. The second circuit serves as a quick charge circuit for quickly charging the electric charge from the electric power supply 53 into the piezoelectric device 31*a* or 31*b* in a direction from the electrode P+ to the electrode P−.

A third circuit is configured by switching circuits 523 and 525. The third circuit serves as a quick charge circuit for quickly charging the electric charge from the electric power supply 53 into the piezoelectric device 31*a* or 31*b* in a direction from the electrode P− to the electrode P+.

A fourth circuit is configured by a constant current circuit 524 for supplying a predetermined limited current to the piezoelectric device 31*a* or 31*b* and the switching circuit 525. The fourth circuit serves as a discharge circuit for gradually discharging the electric charge from the piezoelectric device 31*a* or 31*b* in a direction from the electrode P− to the electrode P+.

Figure 18A:
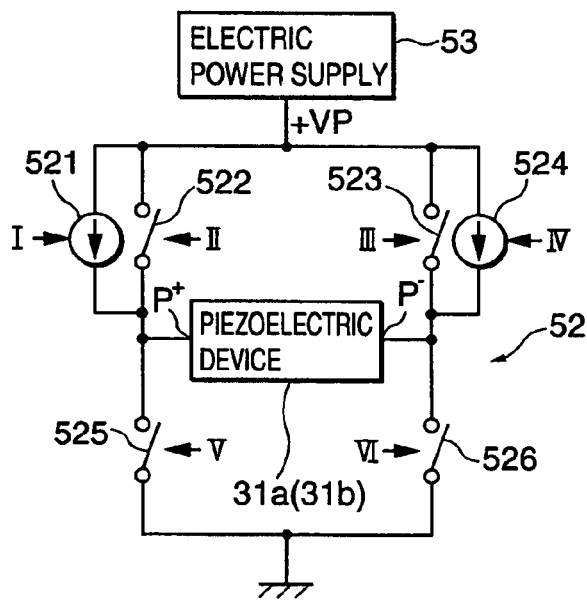
FIGS. 18A to 18D are circuit diagrams respectively showing configuration of inside portions in a driving circuit in FIG. 17.
Figure 18B:
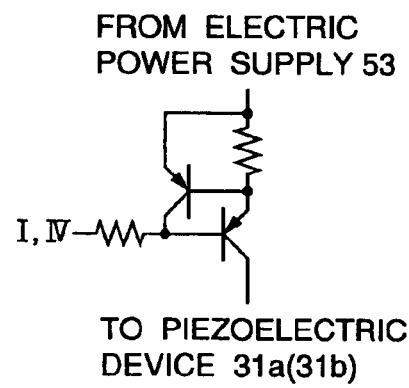

A configuration of the constant current circuits 521 and 524 is shown in FIG. 18B. When level of the control signals I or IV is high, electric current is shut off (switched off). Alternatively, when the level of the control signals I or IV is low, the electric current is flown (switched on).

Figure 18C:
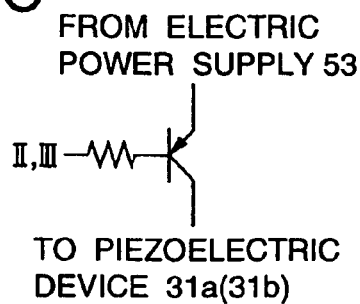

A configuration of the switching circuits 522 and 523 is shown in FIG. 18C. The switch circuits 522 and 523 are respectively configured by a bipolar transistor. When level of the control signal II or III is high, electric current is shut off (switched off). Alternatively, when the level of the control signal II or III is low, the electric current is flown (switched on).

Figure 18D:
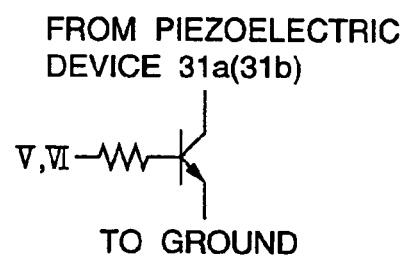

A configuration of the switching circuits 525 and 526 is shown in FIG. 18D. The switch circuits 525 and 526 are respectively configured by a bipolar transistor. When level of the control signal V or VI is low, electric current is shut off (switched off). Alternatively, when the level of the control signal V or VI is high, the electric current is flown (switched on).

Figure 19:
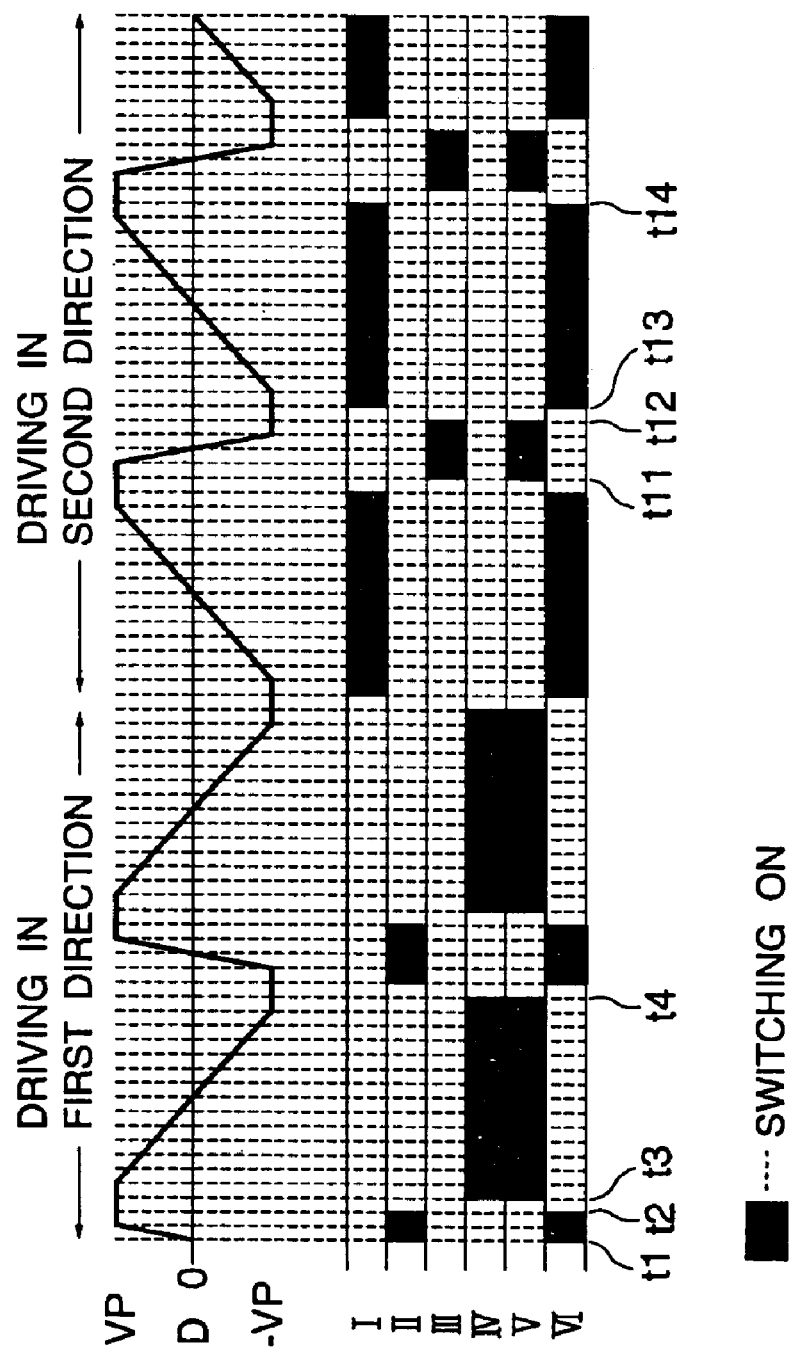
FIG. 19 is a timing chart showing a driving signal and timings of on and off of terminals in a control circuit in FIG. 17.

In FIG. 19, the driving signal D shown a waveform standardized by the polarization direction of the ceramic thin plate of the piezoelectric device. The control signals I to VI respectively correspond to timing signals for switching on and off of the above-mentioned circuits 521 to 526. The painted regions of the control signals I to VI by black respectively show the timings in which the control signals are switched on for switching on the circuits 521 to 526.

An operation of the impact type piezoelectric actuator by the driving apparatus in the fifth embodiment is described with reference to FIG. 19.

For driving the impact type piezoelectric actuator in a first direction, the second circuit and the fourth circuit are alternately switched on. In a time period from t1 to t2, the control signals II and VI are switched on, so that the switching circuits 522 and 526 constituting the second circuit are switched on. Thus, a predetermined short circuited current flows from the electric power supply 53 to the ground through the piezoelectric device 31a or 31b. The electric charge is charged in the piezoelectric device 31a or 31b in a direction from the electrode P+ to the electrode P− due to the capacitance thereof. Thus, the voltage between the electrodes P+ and P− rapidly increases to a level of the voltage VP of the electric power supply 53. The level of the voltage VP is set to be lower than the level of the inversion of the polarization of the ceramic thin plate of the piezoelectric device 31a or 31b. In this time period, the slider 33a shown in FIGS. 8 and 9 is not moved with respect to the stationary member 30a. Similarly, the driving unit 30b shown in FIGS. 10 and 11 is not moved with respect to the base member 34b.

In a time period from t3 to t4, the control signals IV and V are switched on, so that the constant current circuit 525 and the switching circuit 526 constituting the fourth circuit are switched on. In the fourth circuit, a predetermined constant current flows into the piezoelectric device 31a or 31b in a direction from the electrode P− to the electrode P+, so that the electric charge charged at the time t2 gradually is reduced. In other words, the electric charge charged in the piezoelectric device 31a or 31b is gradually discharged. Thus, the voltage between the electrodes P+ and P− gradually decreases to a level of the voltage −VP. In this time period, the slider 33a shown in FIGS. 8 and 9 is moved in the first direction with respect to the stationary member 30a. Similarly, the driving unit 30b shown in FIGS. 10 and 11 is relatively moved in the first direction with respect to the base member 34b.

For driving the impact type piezoelectric actuator in a second direction opposite to the first direction, the rising up of the driving signal D is gradually increased and the falling down thereof is rapidly increased. Concretely, output timings of the control signals from the control circuit 51 is adjusted in a manner so that the control signals III and V are switched on in a time period from t11 to t12 for switching on the third circuit, and the control signals I and VI are switched on in a time period from t13 to t14 for switching on the first circuit.

Sixth Embodiment

A driving apparatus in a sixth embodiment of the present invention is described with reference to FIGS. 20A to 20D and 21. The driving apparatus of the sixth embodiment is suitable for driving the impact type piezoelectric actuators in the third embodiment shown in FIGS. 8 to 11. The block diagram of the driving apparatus in the sixth embodiment is substantially the same as that in the fifth embodiment shown in FIG. 17, so that the illustration thereof is omitted.

Circuit diagrams in the driving circuit are shown in FIGS. 20A to 20D. As can be seen from FIG. 20A, four circuits are provided between an electric power supply 63 and the ground, in which the circuits are connected to the piezoelectric device 31a or 31b for configuring a series circuit. Symbols P+ and P− added to the piezoelectric device 31a or 31b show the electrodes standardized by the polarization of the ceramic thin plate of the piezoelectric device.

A first circuit is configured by a switching circuit 621 and a constant current circuit 626 for supplying a predetermined limited current to the piezoelectric device 31a or 31b. The first circuit serves as a discharge circuit for gradually discharging the electric charge from the piezoelectric device 31a or 31b in a direction from the electrode P+ to the electrode P−.

A second circuit is configured by switching circuits 621 and 625. The second circuit serves as a quick charge circuit for quickly charging the electric charge from the electric power supply 63 to in a direction from the electrode P+ to the electrode P− of the piezoelectric device 31a or 31b.

A third circuit is configured by switching circuits 622 and 624. The third circuit serves as a quick charge circuit for quickly charging the electric charge from the electric power supply 63 to the piezoelectric device 31a or 31b in a direction from the electrode P− to the electrode P+.

A fourth circuit is configured by a switching circuit 622 and a constant current circuit 623 for supplying a predetermined limited current to the piezoelectric device 31a or 31b. The fourth circuit serves as a discharge circuit for gradually discharging the electric charge from the piezoelectric device 31a or 31b in a direction from the electrode P− to the electrode P+.

Figure 20A:
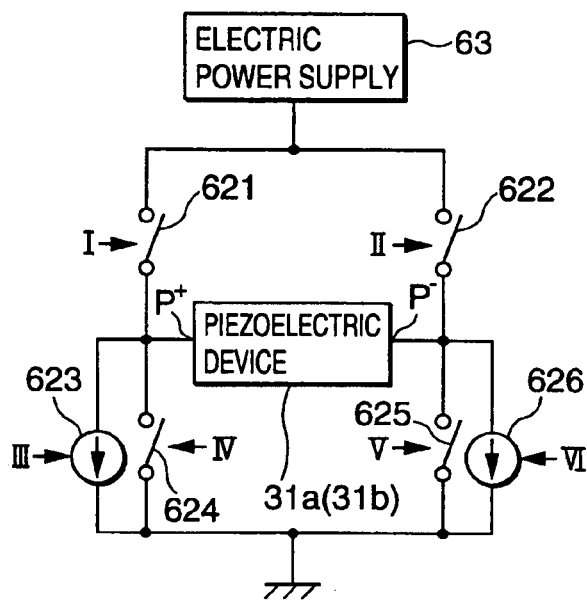
FIGS. 20A to 20D are circuit diagrams respectively showing configuration of inside portions in a driving circuit in a driving apparatus in a sixth embodiment of the present invention.
Figure 20B:
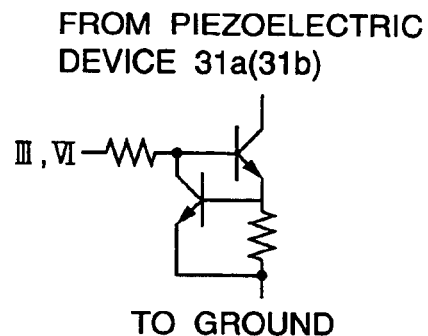

A configuration of the constant current circuits 623 and 626 is shown in FIG. 20B. When level of the control signals III or VI is low, electric current is shut off (switched off). Alternatively, when the level of the control signals III or VI is high, the electric current is flown (switched on).

Figure 20C:
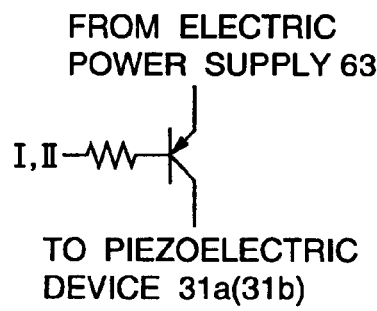

A configuration of the switching circuits 621 and 622 is shown in FIG. 20C. The switch circuits 621 and 622 are respectively configured by a bipolar transistor. When level of the control signal I or II is high, electric current is shut off (switched off). Alternatively, when the level of the control signal I or II is low, the electric current is flown (switched on).

Figure 20D:
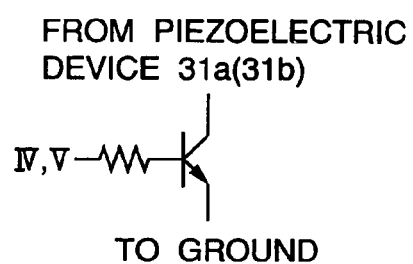

A configuration of the switching circuits 624 and 625 is shown in FIG. 20D. The switch circuits 624 and 625 are respectively configured by a bipolar transistor. When level of the control signal IV or V is low, electric current is shut off (switched off). Alternatively, when the level of the control signal IV or V is high, the electric current is flown (switched on).

Figure 21:
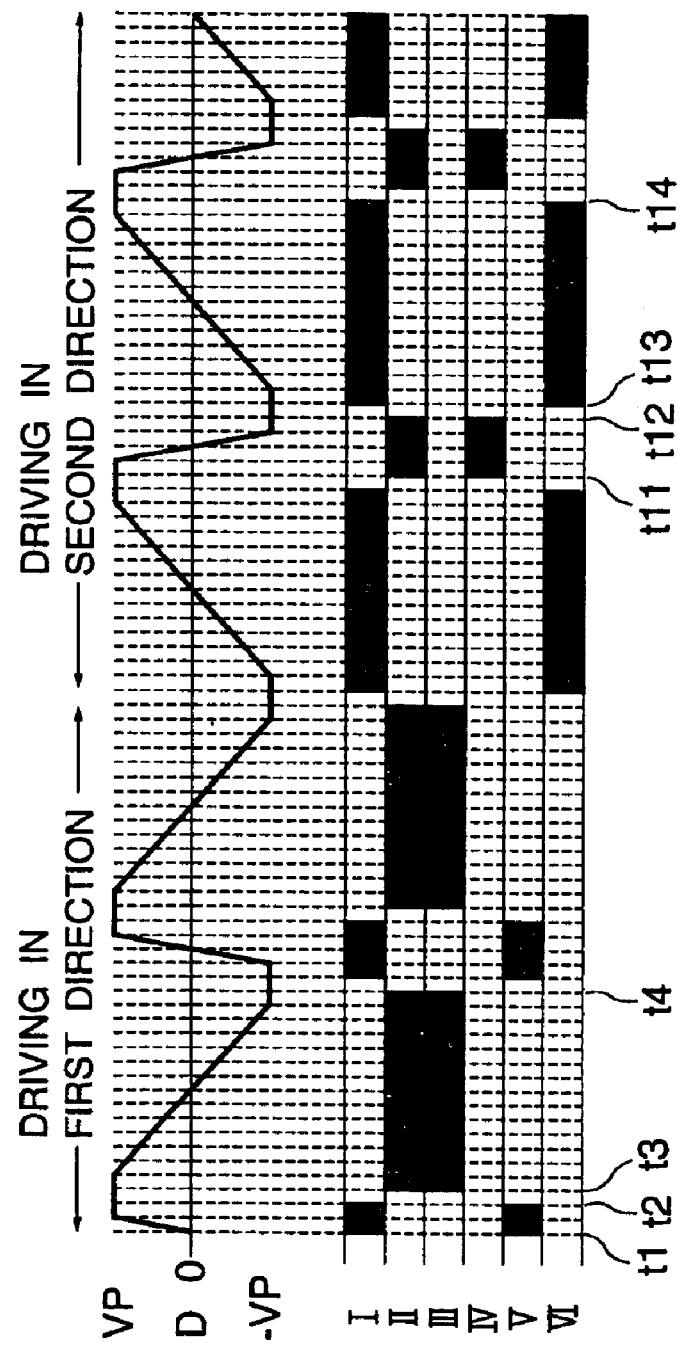
FIG. 21 is a timing chart showing a driving signal and timings of on and off of terminals in a control circuit in FIG. 20.

In FIG. 21, the driving signal D shows a waveform standardized by the polarization direction of the ceramic thin plate of the piezoelectric device. The control signals I to VI respectively correspond to timing signals for switching on and off of the above-mentioned circuits 621 to 626. The painted regions of the control signals I to VI by black respectively show the timings in which the control signals are switched on for switching on the circuits 621 to 626.

An operation of the impact type piezoelectric actuator by the driving apparatus in the sixth embodiment is described with reference to FIG. 21.

For driving the impact type piezoelectric actuator in a first direction, the second circuit and the fourth circuit are alternately switched on. In a time period from t1 to t2, the control signals I and V are switched on, so that the switching circuits 621 and 625 constituting the second circuit are switched on. Thus, a predetermined short circuited current flows from the electric power supply 63 to the ground through the piezoelectric device 31a or 31b. The electric charge is charged into the piezoelectric device 31a or 31b in a direction from the electrode P+ to the electrode P− due to the capacitance thereof. Thus, the voltage between the electrodes P+ and P− rapidly increases to a level of the voltage VP of the electric power supply 63. The level of the voltage VP is set to be lower than the level of the inversion of the polarization of the ceramic thin plate of the piezoelectric device 31a or 31b. In this time period, the slider 33a shown in FIGS. 8 and 9 is not moved with respect to the stationary member 30a. Similarly, the driving unit 30b shown in FIGS. 10 and 11 is not moved with respect to the base member 34b.

In a time period from t3 to t4, the control signals II and III are switched on, so that the switching circuit 622 and the constant current circuit 623 constituting the fourth circuit are switched on. In the fourth circuit, a predetermined constant current flows into the piezoelectric device 31a or 31b in a direction from the electrode P− to the electrode P+, so that the electric charge charged at the time t2 gradually reduces. In other words, the electric charge charged in the piezoelectric device 31a or 31b is gradually discharged. Thus, the voltage between the electrodes P+ and P− gradually decreases to a level of the voltage −VP. In this time period, the slider 33a shown in FIGS. 8 and 9 is moved in the first direction with respect to the stationary member 30a. Similarly, the driving unit 30b shown in FIGS. 10 and 11 is relatively moved in the first direction with respect to the base member 34b.

For driving the impact type piezoelectric actuator in a second direction opposite to the first direction, the rising up of the driving signal D is gradually increased and the falling down thereof is rapidly increased. Concretely, output timings of the control signals from the control circuit 51 is adjusted in a manner so that the control signals II and IV are switched on in a time period from t11 to t12 for switching on the third circuit, and the control signals I and VI are switched on in a time period from t13 to t14 for switching on the first circuit.

Seventh Embodiment

A driving apparatus in a seventh embodiment of the present invention is described with reference to FIGS. 22 and 23. The driving apparatus of the seventh embodiment is suitable for driving the impact type piezoelectric actuators in the third embodiment shown in FIGS. 8 to 11. The block diagram of the driving apparatus in the seventh embodiment is similar to that in the fifth embodiment shown in FIG. 17, so that the illustration thereof is omitted. The bipolar transistors in FIGS. 18C and 18D in the fifth embodiment are replaced by MOSFET in the seventh embodiment.

Figure 22:
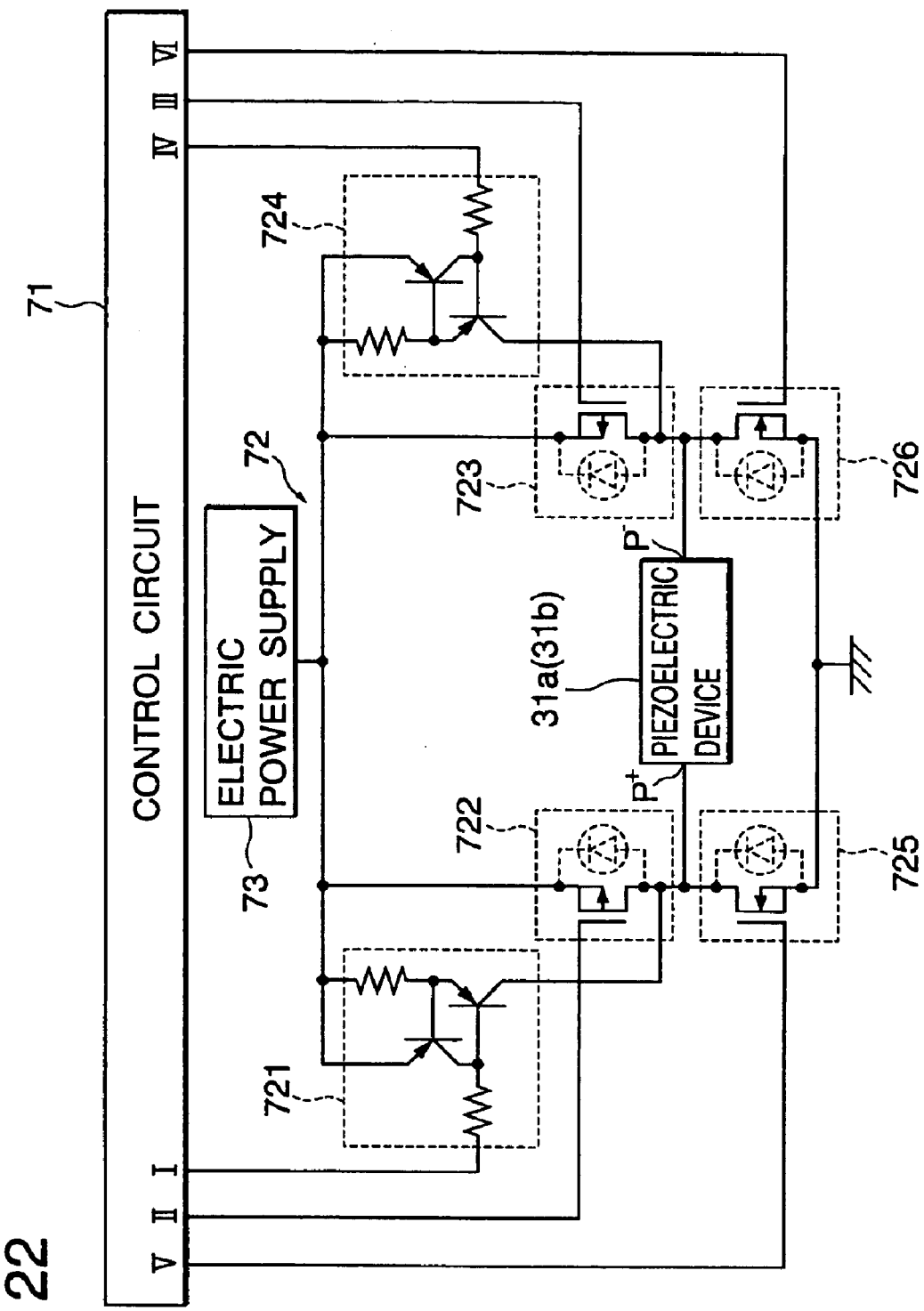
FIG. 22 is a circuit diagram showing a configuration of a driving apparatus in a seventh embodiment of the present invention.

A circuit diagram of the driving apparatus in the seventh embodiment is shown in FIG. 22. As can be seen from FIG. 22, four circuits are provided between an electric power supply 73 and the ground, in which the circuits are connected to the piezoelectric device 31a or 31b for configuring a series circuit. Symbols P+ and P− added to the piezoelectric device 31a or 31b show the electrodes standardized by the polarization of the ceramic thin plate of the piezoelectric device.

A first circuit is configured by a constant current circuit 721 for supplying a predetermined limited current to the piezoelectric device 31a or 31b and a switching circuit 726. The first circuit serves as a discharge circuit for gradually discharging the electric charge from the piezoelectric device 31a or 31b in a direction from the electrode P+ to the electrode P−.

A second circuit is configured by switching circuits 722 and 726. The second circuit serves as a quick charge circuit for quickly charging the electric charge from the electric power supply 73 into the piezoelectric device 31a or 31b in a direction from the electrode P+ to the electrode P−.

A third circuit is configured by switching circuits 723 and 725. The third circuit serves as a quick charge circuit for quickly charging the electric charge from the electric power supply 73 into the piezoelectric device 31a or 31b in a direction from the electrode P− to the electrode P+.

A fourth circuit is configured by a constant current circuit 724 for supplying a predetermined limited current to the piezoelectric device 31a or 31b and the switching circuit 725. The fourth circuit serves as a discharge circuit for gradually discharging the electric charge from the piezoelectric device 31a or 31b in a direction from the electrode P− to the electrode P+.

The switching circuits 722, 723, 725 and 726 are respectively configured by a MOSFET which includes a parasitic diode connected in parallel thereto illustrated by dotted line in the figure.

Figure 23:
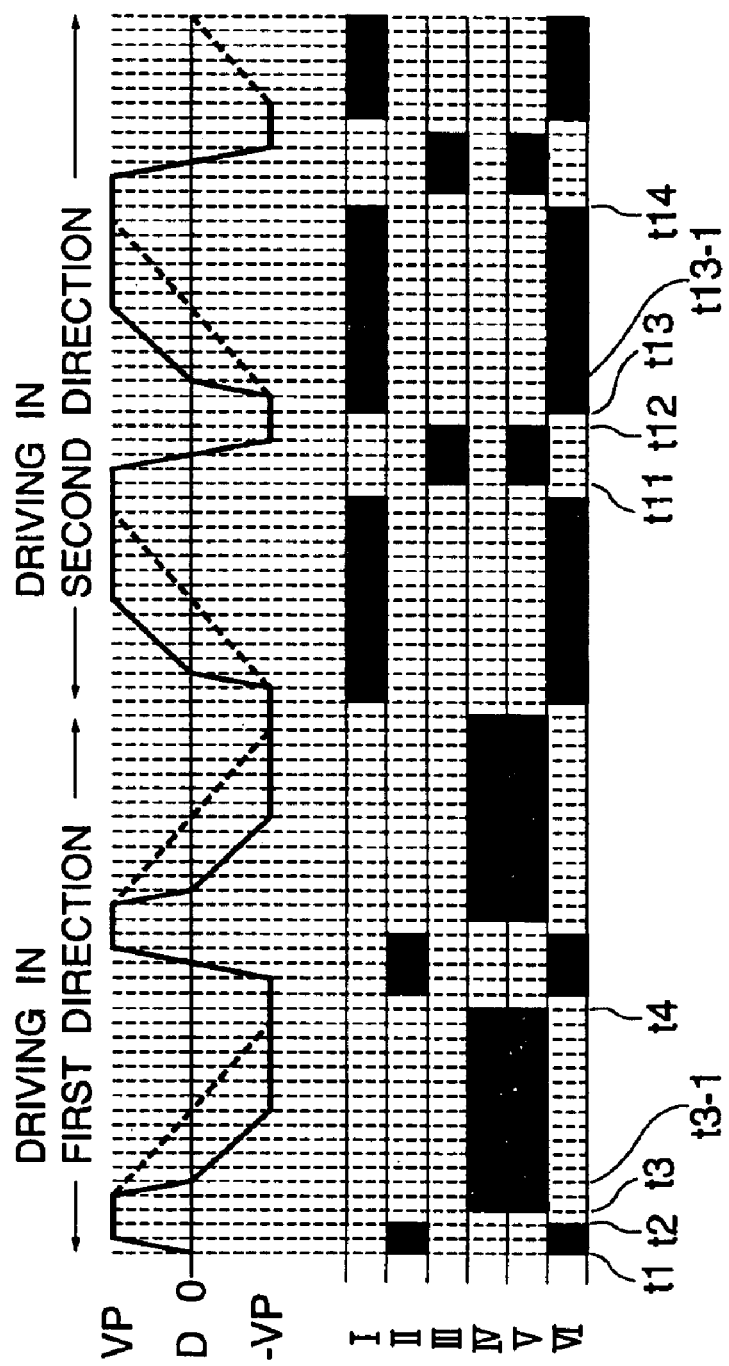
FIG. 23 is a timing chart showing a driving signal and timings of on and off of terminals in a control circuit in FIG. 22.

In FIG. 23, the driving signal D shows a waveform standardized by the polarization direction of the ceramic thin plate of the piezoelectric device. The control signals I to VI respectively correspond to timing signals for switching on and off of the above-mentioned circuits 721 to 726. The painted regions of the control signals I to VI by black respectively show the timings in which the control signals are switched on for switching on the circuits 721 to 726.

An operation of the impact type piezoelectric actuator by the driving apparatus in the seventh embodiment is described with reference to FIG. 23.

For driving the impact type piezoelectric actuator in a first direction, the first circuit and the third circuit are alternately switched on. In a time period from t1 to t2, the control signals II and VI are switched on, so that the switching circuits 722 and 726 constituting the second circuit are switched on. Thus, a predetermined short circuited current flows from the electric power supply 73 to the ground through the piezoelectric device 31a or 31b. The electric charge is charged into the piezoelectric device 31a or 31b in a direction from the electrode P+ to the electrode P− due to the capacitance thereof. Thus, the voltage between the electrodes P+ and P− rapidly increases to a level of the voltage VP of the electric power supply 73. The level of the voltage VP is set to be lower than the level of the inversion of the polarization of the ceramic thin plate of the piezoelectric device 31a or 31b. In this time period, the slider 33a shown in FIGS. 8 and 9 is not moved with respect to the stationary member 30a. Similarly, the driving unit 30b shown in FIGS. 10 and 11 is not moved with respect to the base member 34b.

In a time period from t3 to t4, the control signals IV and V are switched on, so that the constant current circuit 724 and the switching circuit 725 constituting the fourth circuit are switched on. In the fourth circuit, a predetermined constant current flows into the piezoelectric device 31a or 31b in a direction from the electrode P− to the electrode P+, so that the electric charge charged at the time t2 gradually reduces. In other words, the electric charge charged in the piezoelectric device 31a or 31b is gradually discharged. Thus, the voltage between the electrodes P+ and P− gradually decreases to a level of the voltage −VP.

When the electrode P+ of the piezoelectric device 31a or 31b is short circuited by switching on of the switching circuit 725 at the time t3, the electric charge in the piezoelectric device 31a or 31b flows through the parasitic diode of the switching circuit 726 which is at off state. Thus, the potential of the electrode P− of the piezoelectric device 31a or 31b rapidly falls down to 0V as shown by solid line in the time period from t3 to t3−1 on the waveform of the driving signal D in FIG. 23. After the parasitic diode cannot serve, the electric charge in the piezoelectric device 31a or 31b is gradually discharged along a incline similar to the incline illustrated by dotted line in FIG. 23.

In the seventh embodiment, parts of the driving circuit are configured by the MOSFETs, so that switching speed of the transistors can be made faster, and the consumption of the electric current by the driving circuit can be reduced. The electric charge in the piezoelectric device 31a or 31b is rapidly discharged by the parasitic diode until the potential of both electrodes P+ and P− becomes 0V, so that there is a possibility to deteriorate the output characteristics of the impact type piezoelectric actuator. However, it was actually no problem in the output characteristics of the impact type piezoelectric actuator when it was driven by the driving signal having the waveform shown in FIG. 23.

In this time period from t3 to t4, the slider 33a shown in FIGS. 8 and 9 is moved in the first direction with respect to the stationary member 30a. Similarly, the driving unit 30b shown in FIGS. 10 and 11 is relatively moved in the first direction with respect to the base member 34b.

For driving the impact type piezoelectric actuator in a second direction opposite to the first direction, the rising up of the driving signal D is gradually increased and the falling down thereof is rapidly increased. Concretely, output timings of the control signals from the control circuit 71 is adjusted in a manner so that the control signals I and VI are switched on in a time period from t11 to t12 for switching on the third circuit, and the control signals III and V are switched on in a time period from t13 to t14 for switching on the first circuit.

Eighth Embodiment

A driving apparatus in an eighth embodiment of the present invention is described with reference to FIGS. 24 and 25. The driving apparatus of the eighth embodiment is suitable for driving the impact type piezoelectric actuators in the third embodiment shown in FIGS. 8 to 11. The block diagram of the driving apparatus in the eighth embodiment is similar to that in the fifth embodiment shown in FIG. 17, so that the illustration thereof is omitted. The bipolar transistors in FIGS. 20C and 20D in the sixth embodiment are replaced by MOSFET in the eighth embodiment.

Figure 24:
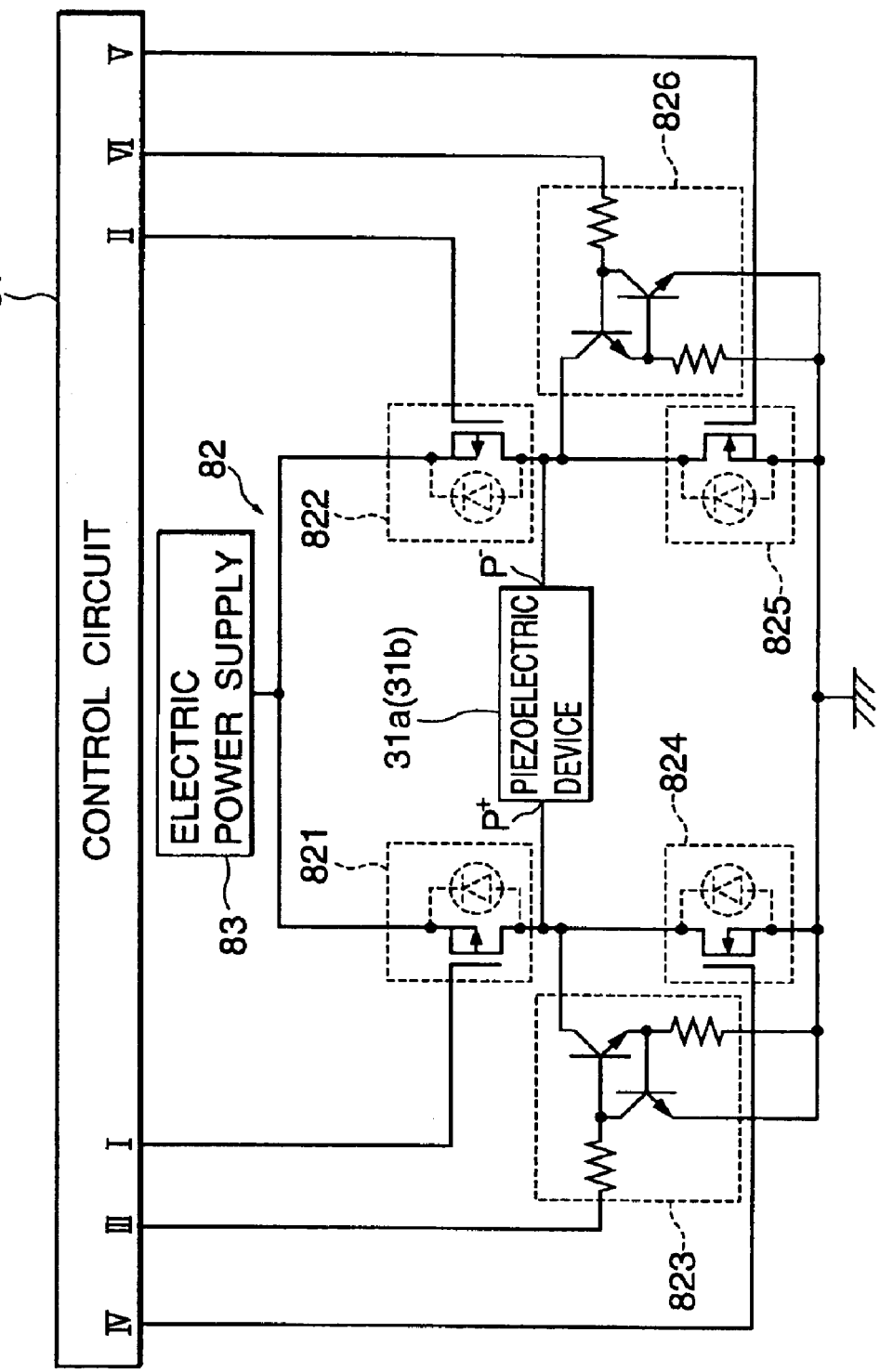
FIG. 24 is a circuit diagram showing a configuration of a driving apparatus in an eighth embodiment of the present invention.

A circuit diagram of the driving apparatus in the eighth embodiment is shown in FIG. 24. As can be seen from FIG. 24, four circuits are provided between an electric power supply 83 and the ground, in which the circuits are connected to the piezoelectric device 31a or 31b for configuring a series circuit. Symbols P+ and P− added to the piezoelectric device 31a or 31b show the electrodes standardized by the polarization of the ceramic thin plate of the piezoelectric device.

A first circuit is configured by a switching circuit 821 and a constant current circuit 826 for supplying a predetermined limited current to the piezoelectric device 31a or 31b. The first circuit serves as a discharge circuit for gradually discharging the electric charge from the piezoelectric device 31a or 31b in a direction from the electrode P+ to the electrode P−.

A second circuit is configured by switching circuits 821 and 825. The second circuit serves as a quick charge circuit for quickly charging the electric charge from the electric power supply 83 into the piezoelectric device 31a or 31b in a direction from the electrode P+ to the electrode P−.

A third circuit is configured by switching circuits 822 and 824. The third circuit serves as a quick charge circuit for quickly charging the electric charge from the electric power supply 83 into the piezoelectric device 31a or 31b in a direction from the electrode P− to the electrode P+.

A fourth circuit is configured by the switching circuit 822 and a constant current circuit 823 for supplying a predetermined limited current to the piezoelectric device 31a or 31b. The fourth circuit serves as a discharge circuit for gradually discharging the electric charge from the piezoelectric device 31a or 31b in a direction from the electrode P− to the electrode P+.

The switching circuits 821, 822, 824 and 825 are respectively configured by a MOSFET which includes a parasitic diode connected in parallel thereto illustrated by dotted line in the figure.

Figure 25:
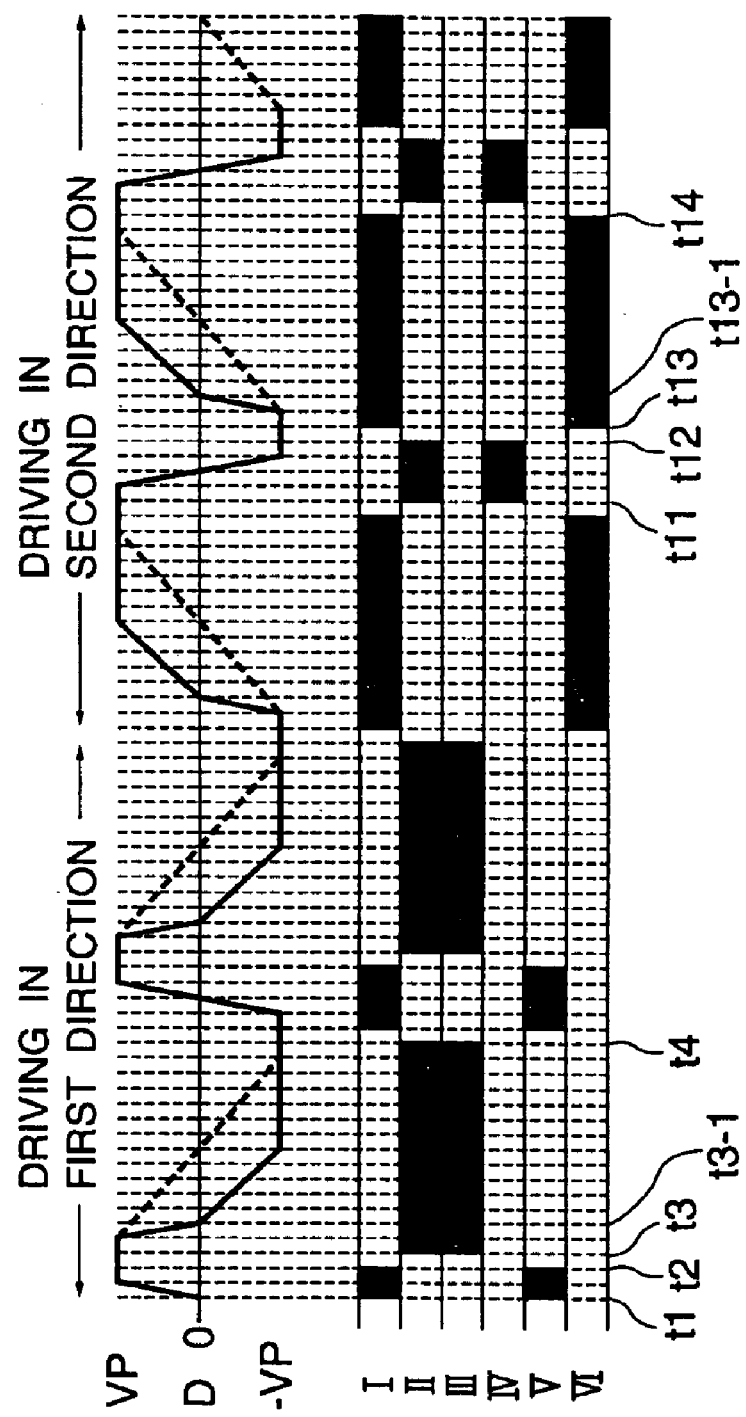
FIG. 25 is a timing chart showing a driving signal and timings of on and off of terminals in a control circuit in FIG. 24.

In FIG. 25, the driving signal D shows a waveform standardized by the polarization direction of the ceramic thin plate of the piezoelectric device. The control signals I to VI respectively corresponds to timing signals for switching on and off of the above-mentioned circuits 821 to 826. The painted regions of the control signals I to VI by black respectively show the timings in which the control signals are switched on for switching on the circuits 821 to 826.

An operation of the impact type piezoelectric actuator by the driving apparatus in the eighth embodiment is described with reference to FIG. 25.

For driving the impact type piezoelectric actuator in a first direction, the first circuit and the third circuit are alternately switched on. In a time period from t1 to t2, the control signals I and V are switched on, so that the switching circuits 821 and 825 constituting the second circuit are switched on. Thus, a predetermined short circuited current flows from the electric power supply 83 to the ground through the piezoelectric device 31a or 31b. The electric charge is charged into the piezoelectric device 31a or 31b in a direction from the electrode P+ to the electrode P− due to the capacitance thereof. Thus, the voltage between the electrodes P+ and P− rapidly increases to a level of the voltage VP of the electric power supply 83. The level of the voltage VP is set to be lower than the level of the inversion of the polarization of the ceramic thin plate of the piezoelectric device 31a or 31b. In this time period, the slider 33a shown in FIGS. 8 and 9 is not moved with respect to the stationary member 30a. Similarly, the driving unit 30b shown in FIGS. 10 and 11 is not moved with respect to the base member 34b.

In a time period from t3 to t4, the control signals II and III are switched on, so that the switching circuit 822 and the constant current circuit 823 constituting the fourth circuit are switched on. In the fourth circuit, a predetermined constant current flows into the piezoelectric device 31a or 31b in a direction from the electrode P− to the electrode P+, so that the electric charge charged at the time t2 gradually reduces. In other words, the electric charge charged in the piezoelectric device 31a or 31b is gradually discharged. Thus, the voltage between the electrodes P+ and P− gradually decreases to a level of the voltage −VP.

When the electrode P+ of the piezoelectric device 31a or 31b is short circuited by switching on of the switching circuit 824 at the time t3, the electric charge in the piezoelectric device 31a or 31b flows through the parasitic diode of the switching circuit 825 which is at off state. Thus, the potential of the electrode P− of the piezoelectric device 31a or 31b rapidly falls down to 0V as shown by solid line in the time period from t3 to t3−1 on the waveform of the driving signal D in FIG. 25. After the parasitic diode cannot serve, the electric charge in the piezoelectric device 31a or 31b is gradually discharged along a incline similar to the incline illustrated by dotted line in FIG. 25.

In the eighth embodiment, parts of the driving circuit are configured by the MOSFETs, so that switching speed of the transistors can be made faster, and the consumption of the electric current by the driving circuit can be reduced. The electric charge in the piezoelectric device 31a or 31b is rapidly discharged by the parasitic diode until the potential of both electrodes P+ and P− becomes 0V, so that there is a possibility to deteriorate the output characteristics of the impact type piezoelectric actuator. However, it was actually no problem in the output characteristics of the impact type piezoelectric actuator when it was driven by the driving signal having the waveform shown in FIG. 23.

In this time period from t3 to t4, the slider 33a shown in FIGS. 8 and 9 is moved in the first direction with respect to the stationary member 30a. Similarly, the driving unit 30b shown in FIGS. 10 and 11 is relatively moved in the first direction with respect to the base member 34b.

For driving the impact type piezoelectric actuator in a second direction opposite to the first direction, the rising up of the driving signal D is gradually increased and the falling down thereof is rapidly increased. Concretely, output timings of the control signals from the control circuit 81 is adjusted in a manner so that the control signals II and IV are switched on in a time period from t11 to t12 for switching on the third circuit, and the control signals I and VI are switched on in a time period from t13 to t14 for switching on the first circuit.

Ninth Embodiment

A driving apparatus in a ninth embodiment of the present invention is described with reference to FIG. 26. The driving apparatus of the ninth embodiment is suitable for driving the impact type piezoelectric actuators in the third embodiment shown in FIGS. 8 to 11. The block diagram of the driving apparatus in the ninth embodiment is similar to that in the fifth embodiment shown in FIG. 17, so that the illustration thereof is omitted.

Figure 26:
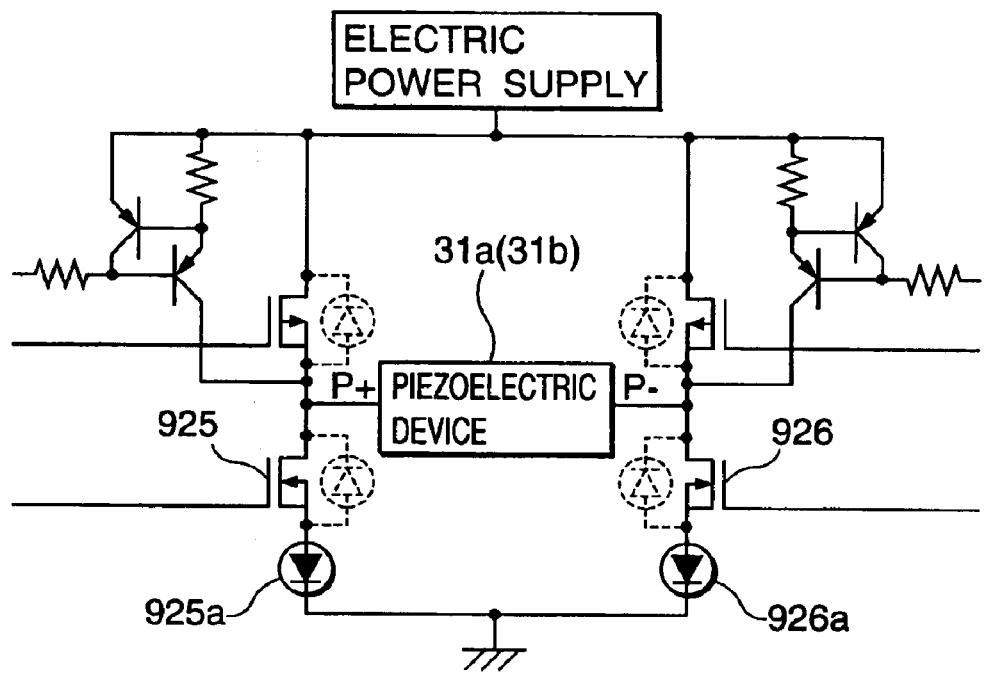

FIG. 26 shows a main part of a circuit diagram of the driving apparatus in the ninth embodiment, in which switching circuits 925 and 926 configured by MOSFETs replace the switching circuits 725 and 726 configured by the bipolar transistors in FIG. 22 showing the circuit diagram of the driving circuit in the seventh embodiment. Furthermore, diodes 925*a* and 926*a* are connected as series connection to the MOSFETs of the switching circuits 925 and 926 in forward direction (opposite direction to the parasitic diodes shown by dotted lines).

The diodes 925*a* and 926*a* are effective for easing the rapid discharge of the electric charge from the piezoelectric device 31*a* or 31*b* by the parasitic diodes of the MOSFETs, if the deterioration of the output characteristics of the impact type piezoelectric actuator due to the rapid falling down of the potential of the piezoelectric device 31*a* or 31*b* becomes problem.

Tenth Embodiment

A driving apparatus in a tenth embodiment of the present invention is described with reference to FIG. 27. The driving apparatus of the tenth embodiment is suitable for driving the impact type piezoelectric actuators in the third embodiment shown in FIGS. 8 to 11. The block diagram of the driving apparatus in the tenth embodiment is similar to that in the fifth embodiment shown in FIG. 17, so that the illustration thereof is omitted.

Figure 27:
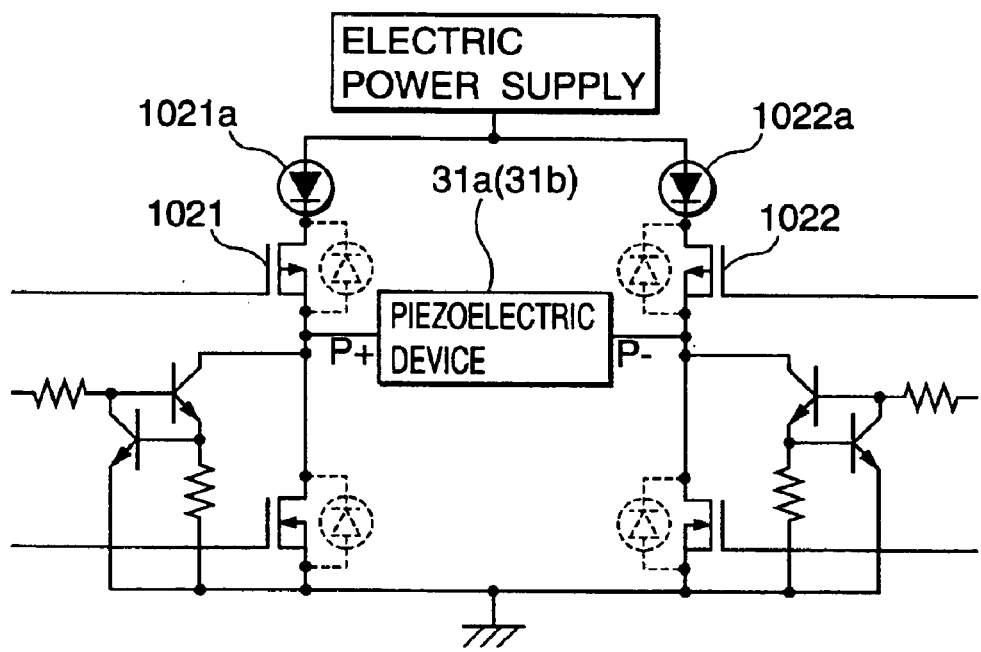
FIG. 27 is a circuit diagram showing a configuration of a driving apparatus in a tenth embodiment of the present invention.

FIG. 27 shows a main part of a circuit diagram of the driving apparatus in the tenth embodiment, in which switching circuits 1021 and 1022 configured by MOSFETs replace the switching circuits 821 and 822 configured by the bipolar transistors in FIG. 24 showing the circuit diagram of the driving circuit in the eighth embodiment. Furthermore, diodes 1021*a* and 1022*a* are connected as series connection to the MOSFETs of the switching circuits 1021 and 1022 in forward direction (opposite direction to the parasitic diodes shown by dotted lines).

The diodes 1021*a* and 1022*a* are effective for easing the rapid discharge of the electric charge from the piezoelectric device 31*a* or 31*b* by the parasitic diodes of the MOSFETs, if the deterioration of the output characteristics of the impact type piezoelectric actuator due to the rapid falling down of the potential of the piezoelectric device 31*a* or 31*b* becomes problem.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be constructed as being included therein.

What is claimed is:

1. An actuator comprising:

a first piezoelectric device serving as a driving source when a driving signal is applied in a polarization direction thereof;

a second piezoelectric device disposed for crossing the first piezoelectric device at a predetermined angle and for serving as a driving source when a driving signal is applied in a polarization direction thereof;

a driving member provided at a crossing point of the first and second piezoelectric devices and connected to top ends of the first and second piezoelectric devices;

two driving units respectively supplying driving signals to the first and second piezoelectric devices including the following three elements (a), (b) and (c):

(a) a waveform generator for generating a signal varying corresponding to the passage of time;

(b) a first driver for generating a first voltage signal having a maximum voltage smaller than a voltage of inversion of polarization of the piezoelectric device by using the signal from the waveform generator, and for applying the first voltage signal to the piezoelectric device in the polarization direction; and (c) a second driver for generating a second voltage signal having a maximum voltage smaller than the voltage of inversion of polarization of the piezoelectric device and the same polarity as that of the first driving signal by using the signal from the waveform generator, and for applying the second voltage signal to the piezoelectric device in a direction opposite to the polarization direction; and a first controller for applying the driving signals from the driving units to the first and second piezoelectric devices with a predetermined phase difference so that the driving member is moved for trailing an ellipse or a circle and a driven object contacting to the driving member is mechanically driven.

2. The actuator in accordance with claim 1, wherein the second driving signal has a waveform which is an inversion of a waveform of the first driving signal.

3. The actuator in accordance with claim 1, wherein the waveform of the first and second driving signals are a sine wave.

4. The actuator in accordance with claim 1, wherein the waveform of the first and second driving signals are a sawtooth wave in which the inclination in a rising up portion is different from that in a falling down portion.

5. The actuator in accordance with claim 1, wherein the first driver and the second driver respectively includes an amplifier for amplifying the signal from the waveform generator.

* * * * *